United States Patent
Yasui et al.

(10) Patent No.: US 12,443,098 B2
(45) Date of Patent: Oct. 14, 2025

(54) OPTICAL ELEMENT, ILLUMINATION APPARATUS, AND PROJECTIVE DISPLAY APPARATUS

(71) Applicant: SONY GROUP CORPORATION, Tokyo (JP)

(72) Inventors: Toshifumi Yasui, Kanagawa (JP); Yusuke Kono, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 385 days.

(21) Appl. No.: 17/916,973

(22) PCT Filed: Feb. 17, 2021

(86) PCT No.: PCT/JP2021/005841
§ 371 (c)(1),
(2) Date: Oct. 4, 2022

(87) PCT Pub. No.: WO2021/210260
PCT Pub. Date: Oct. 21, 2021

(65) Prior Publication Data
US 2023/0161238 A1    May 25, 2023

(30) Foreign Application Priority Data
Apr. 14, 2020 (JP) ................. 2020-072258

(51) Int. Cl.
G03B 21/20 (2006.01)
(52) U.S. Cl.
CPC ....... G03B 21/208 (2013.01); G03B 21/2033 (2013.01)
(58) Field of Classification Search
CPC ................. G03B 21/208; G03B 21/2033
(Continued)

(56) References Cited

U.S. PATENT DOCUMENTS

| 4,427,265 A | 1/1984 | Suzuki et al. |
| 7,646,518 B2 | 1/2010 | Kasazumi |

(Continued)

FOREIGN PATENT DOCUMENTS

| CN | 1764516 A | 4/2006 |
| CN | 104965307 | 10/2015 |

(Continued)

OTHER PUBLICATIONS

International Search Report and Written Opinion prepared by the Japan Patent Office on Apr. 15, 2021, for International Application No. PCT/JP2021/005841, 3 pgs.

*Primary Examiner* — Jerry L Brooks
(74) *Attorney, Agent, or Firm* — SHERIDAN ROSS P.C.

(57) ABSTRACT

An illumination apparatus includes a light source, an optical member, and an integrator. The optical member is rotatable around a rotation axis AR. A planar shape of the optical member is annular around the rotation axis AR. A first surface of the optical member is provided with a recessed and protruding portion. Multiple recessed and protruding structure units are consecutively formed on the optical member. Adjacent recessed and protruding structure units are in a mirror symmetry relation, and the recessed and protruding portions of the adjacent recessed and protruding structure units are smoothly connected together. Recessed portions and protruding portions of the recessed and protruding portion of each recessed and protruding structure unit are smoothly connected together. An area occupied by the recessed and protruding portion of each recessed and protruding structure unit is larger in size than incident light from the light surface.

18 Claims, 26 Drawing Sheets

(58) Field of Classification Search
USPC .......................................................... 353/31
See application file for complete search history.

(56) References Cited

U.S. PATENT DOCUMENTS

| | | | |
|---|---|---|---|
| 11,061,311 B2 * | 7/2021 | Imai | ................ G02B 5/20 |
| 2007/0019921 A1 | 1/2007 | Yonekubo et al. | |
| 2008/0165401 A1 | 7/2008 | Kasazumi | |
| 2015/0362725 A1 | 12/2015 | Zhu et al. | |
| 2019/0107781 A1 | 4/2019 | Tinnemans et al. | |

FOREIGN PATENT DOCUMENTS

| | | |
|---|---|---|
| CN | 105301793 | 2/2016 |
| JP | S57-13401 | 1/1982 |
| JP | 2007-025466 | 2/2007 |
| JP | 2008-046523 | 2/2008 |
| JP | 2012-159823 | 8/2012 |
| JP | 2014-182207 | 9/2014 |
| JP | 2018-132547 | 8/2018 |
| TW | 201809727 A | 3/2018 |
| WO | WO 2006/090681 | 8/2006 |

* cited by examiner

OPTICAL ELEMENT, ILLUMINATION APPARATUS, AND PROJECTIVE DISPLAY APPARATUS

CROSS REFERENCE TO RELATED APPLICATIONS

This application is a national stage application under 35 U.S.C. 371 and claims the benefit of PCT Application No. PCT/JP2021/005841, having an international filing date of 17 Feb. 2021, which designated the United States, which PCT application claimed the benefit of Japanese Patent Application No. 2020-072258, filed 14 Apr. 2020, the entire disclosures of each of which are incorporated herein by reference.

TECHNICAL FIELD

The present disclosure relates to an optical element, an illumination apparatus including the optical element, and a projective display apparatus including the illumination apparatus (projector).

BACKGROUND ART

In recent years, projective display apparatuses (projectors) using semiconductor laser elements as a light source have increasingly frequently been used. However, semiconductor laser elements have the problems of a high coherency and a high speckle contrast. For example, PTL 1 discloses a projector in which a rotating diffusion element has a two-layer structure. In the technology disclosed in PTL 1, a second light diffusion layer has a higher diffusive power than a first light diffusion layer, and the technology is intended to reduce backscattering, increase light usage efficiency, and reduce speckle noise. Additionally, for example, PTL 2 discloses a projector using a rotating hologram element as a first diffusion section.

CITATION LIST

Patent Literature

[PTL 1]
Japanese Patent Laid-open No. 2014-182207
[PTL 2]
Japanese Patent Laid-open No. 2012-159823

SUMMARY

Technical Problems

Incidentally, the technology disclosed in PTL 1 uses diffusion plates, but a diffusion angle distribution formed by the diffusion plates is typically a circular distribution, a flat Gaussian distribution, or the like. Specifically, when the shape of light obtained by cutting the light along a virtual plane orthogonal to a traveling direction of the light is hereinafter referred to as a "cross-sectional shape of the light," the cross-section shape of light emitted from the diffusion plate is like a circle. Additionally, the intensity distribution of light emitted from the diffusion plate has a flat Gaussian distribution on the virtual plane. Accordingly, the reduction of the speckle contract is limited. Additionally, the hologram element depends strongly on wavelength, and it is difficult to design, in the technology disclosed in PTL 2, a hologram element having diffraction characteristics that are equivalent with respect to all of red/green/blue colors. Accordingly, a hologram element needs to be disposed for each of the red/green/blue colors, leading to high costs and an increased size of the apparatus.

Consequently, an object of the present disclosure is to enable the speckle contrast to be significantly reduced and provide an illumination apparatus having a configuration and a structure that allow the use of a light source that emits light with multiple wavelengths, a projective display apparatus (projector) including the illumination apparatus, an optical element that is suitably used in the illumination apparatus.

Solution to Problems

An illumination apparatus of the present disclosure configured to achieve the object includes a light source, an optical member including a first surface on which light from the light source is incident and a second surface facing the first surface, and an integrator on which light emitted from the optical member is incident, in which the optical member is rotatable around a rotation axis extending parallel to a direction in which light from the light source is incident and is emitted, a planar shape of the optical member (the planar shape of the optical member obtained by cutting the optical member along a virtual plane orthogonal to the rotation axis) is annular around the rotation axis, multiple recessed and protruding structure units each having a fan-surface-like planar shape and including a recessed and protruding portion are consecutively formed on the first surface or the second surface of the optical member, an extended line of a boundary between adjacent recessed and protruding structure units intersects the rotation axis, when the boundary between the adjacent recessed and protruding structure units is a mirror plane, the adjacent recessed and protruding structure units are in a mirror symmetry relation, and recessed and protruding portions of the adjacent recessed and protruding structure units are smoothly connected together, and recessed portions and protruding portions of the recessed and protruding portion of each recessed and protruding structure unit are smoothly connected together, and an area occupied by the recessed and protruding portion of each recessed and protruding structure unit is larger in size than incident light from the light surface.

To achieve the above-described object, a projective display apparatus (projector) of the present disclosure includes an illumination apparatus including a light source, an optical member on and from which light from the light source is incident and is emitted, and an integrator on which light from the optical member is incident, an optical modulation apparatus configured to modulate light emitted from the illumination apparatus on a basis of image information to generate an image, and a projective optical system configured to receive an image projected from the optical modulation apparatus, in which the illumination apparatus includes the illumination apparatus of the present disclosure.

An optical element of the present disclosure configured to achieve the above-described object includes a first surface and a second surface facing the first surface, in which light from a light source emitting light with multiple wavelengths is incident on the first surface, the first surface or the second surface is provided with a recessed and protruding portion configured to refract incident light from the light source, an area occupied by the recessed and protruding portion is larger in size than incident light from the light source, the recessed portions and the protruding portions of the recessed and protruding portion are smoothly connected together, and, when a shape of light obtained by cutting the light along a virtual plane orthogonal to a traveling direction of the light is referred to as a cross-sectional shape of the light, the cross-sectional shape of light emitted from the optical element is like a rectangle, a polygon, or a shape with one or more angles.

BRIEF DESCRIPTION OF DRAWINGS

FIG. 24 (a) of FIG. 24 is a diagram schematically depicting arrangement of a light source in the illumination apparatus of Example 3, (b) of FIG. 24 is a diagram depicting a light emission angle distribution of light emitted from the recessed and protruding structure unit toward the integrator, and (c) of FIG. 24 is a diagram depicting a light position distribution on the integrator.

DESCRIPTION OF EMBODIMENTS

Figure 1:
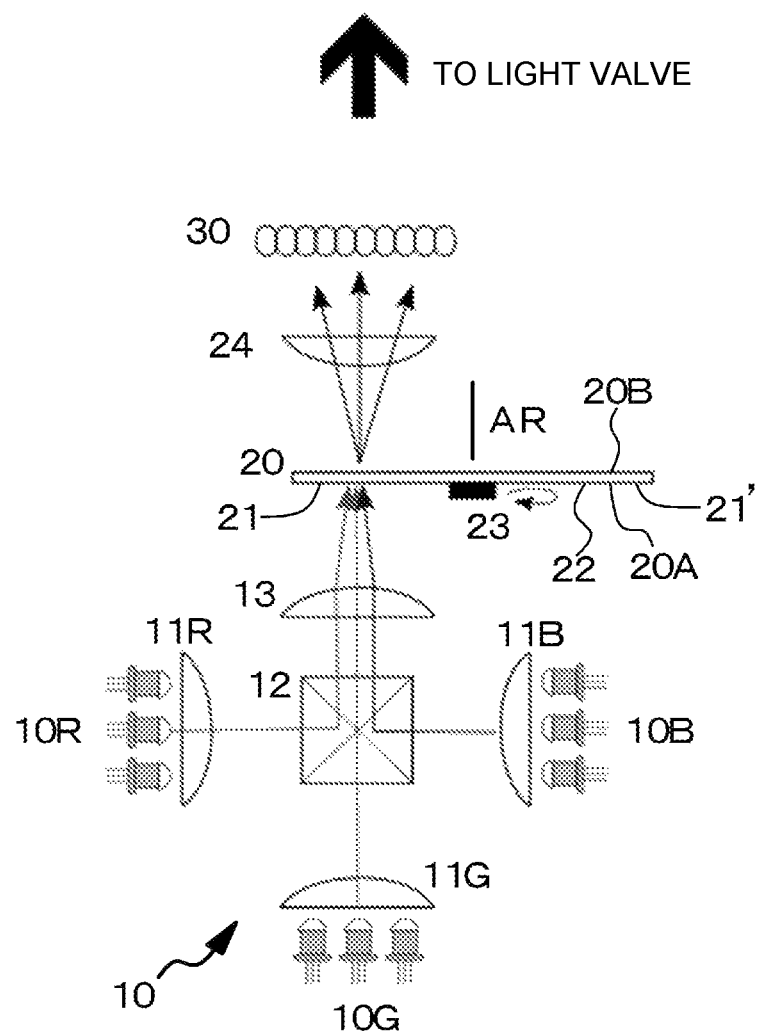
FIG. 1 is a conceptual drawing of an illumination apparatus of Example 1.

With reference to the drawings, the present disclosure will be described below on the basis of embodiments. However, the present disclosure is not limited to the embodiments, and various numeral values and materials in the embodiments are illustrative. Note that the description is in the following order.

1. Description of Optical Element, Illumination Apparatus, and Projective Display Apparatus of Present Disclosure in General
2. Example 1 (Optical Element, Illumination Apparatus, and Projective Display Apparatus of Present Disclosure)
3. Example 2 (Modification of Example 1)
4. Example 3 (Another Modification of Example 1)
5. Others <Description of Optical Element, Illumination Apparatus, and Projective Display Apparatus of Present Disclosure in General>

An illumination apparatus of the present disclosure, or an illumination apparatus of the present disclosure constituting a projective display apparatus of the present disclosure (the illumination apparatus and the projective display apparatus may hereinafter be collectively referred to as the "illumination apparatus of the present disclosure and the like") can be configured such that a recessed and protruding section refracts incident light from a light source. This also applies to an optical element of the present disclosure.

The illumination apparatus of the present disclosure and the like including the above-described preferred forms can be configured such that the light source emits light with multiple wavelengths. This also applies to the optical element of the present disclosure.

The illumination apparatus of the present disclosure and the like including the above-described preferred forms can be configured such that, when the shape of light obtained by cutting the light along a virtual plane orthogonal to the traveling direction of the light is referred to as the cross-sectional shape of the light, the cross-sectional shape of light incident on the recessed and protruding structure unit from the light source differs from the cross-sectional shape of light emitted from the recessed and protruding structure unit. Specifically, the illumination apparatus of the present disclosure and the like including the above-described preferred forms can be configured such that the cross-sectional shape of light emitted from the recessed and protruding structure unit is like a rectangle, a polygon, or a shape having one or more angles. In other words, the cross-sectional shape of light emitted from the recessed and protruding structure unit can be a shape other than a circle or an ellipse. This also applies to the optical element of the present disclosure.

Furthermore, the illumination apparatus of the present disclosure and the like including the above-described preferred forms can be configured such that the light source includes multiple light emitting elements arrayed in a two-dimensional matrix, when the shape of light obtained by cutting the light along a virtual plane orthogonal to the traveling direction of the light is referred to as the cross-sectional shape of the light, the cross-sectional shape of light emitted from the recessed and protruding structure unit is approximate to the arrangement shape of the light emitting elements arranged in the outermost portion of the light source.

In this case, the illumination apparatus of the present disclosure including the above-described preferred forms can be configured such that the multiple light emitting elements are arrayed on intersections in an orthogonal grid, the arrangement shape of multiple the light emitting elements arranged at an outer edge portion of the light source is like a rectangle, and the cross-sectional shape of light emitted from the recessed and protruding structure unit is like a rectangle, or the multiple light emitting elements are arrayed on intersections in a honeycomb lattice, the arrangement shape of multiple the light emitting elements at the outer edge portion of the light source is like a regular hexagon, and the cross-sectional shape of light emitted from the recessed and protruding structure unit is a regular hexagon.

Alternatively, the illumination apparatus of the present disclosure including the above-described preferred forms can be configured such that the light source includes multiple light emitting elements arrayed in a two-dimensional matrix, and the cross-sectional shape of light emitted from the recessed and protruding structure unit is approximate to the external shape of the integrator.

In this case, the illumination apparatus of the present disclosure including the above-described preferred forms can be configured such that the multiple light emitting elements are arrayed on intersections in an orthogonal grid, and the external shape of the integrator is like a square or a rectangle.

Furthermore, the illumination apparatus of the present disclosure and the like including the above-described preferred forms can be configured such that the recessed and protruding portion of the recessed and protruding structure unit is designed in compliance with a Gerchberg-Saxton method (hereinafter sometimes referred to as the "GS method" for convenience) or a repeated Fourier method.

Furthermore, the illumination apparatus of the present disclosure and the like including the above-described preferred forms can be configured such that, when an X axis refers to an axis passing through the center of the recessed and protruding structure unit and through a rotation axis and located in a surface of the recessed and protruding structure unit provided with the recessed and protruding portion, a Z axis refers to an axis passing through the center of the recessed and protruding structure unit and that is parallel to the rotation axis, and a Y axis refers to an axis that is orthogonal to the X axis and the Z axis and that is located in a surface of the recessed and protruding structure unit provided with the recessed and protruding portion, the average value $F_{X\text{-}ave}$ of the spatial frequency of the recessed and protruding portion along the X axis is $1 \times 10^3$ mm$^{-1}$ or less, preferably $1 \times 10^2$ mm$^{-1}$ or less, and the average value $F_{Y\text{-}ave}$ of the spatial frequency of the recessed and protruding portion along the Y axis is $1 \times 10^3$ mm$^{-1}$ or less, preferably $1 \times 10^2$ mm$^{-1}$ or less. In this case, the illumination apparatus of the present disclosure and the like including the above-described preferred forms can be configured such that, when $F_{X'\text{-}ave}$ denotes the average value of the spatial frequency of the recessed and protruding portion along a straight line satisfying Y=X and $F_{Y'\text{-}ave}$ denotes the average value of the spatial frequency of the recessed and protruding portion along a straight line satisfying Y=−X, $F_{X'\text{-}ave} > F_{X\text{-}ave}$, $F_{X'\text{-}ave} > F_{Y\text{-}ave}$, $F_{Y'\text{-}ave} > F_{X\text{-}ave}$, and $F_{Y'-ave} > F_{Y-ave}$ are satisfied. Note that the center of light incident on the recessed and protruding structure unit is defined as the area center of gravity of the cross-sectional shape of the incident light in a case where the cross-sectional shape of the incident light is not a circle or an ellipse or is an odd shape.

Furthermore, the illumination apparatus of the present disclosure and the like including the above-described preferred forms can be configured such that, when $L_{X-0}$ denotes the length along the X axis of the recessed and protruding structure unit on which light from the light source is incident and $L_{Y-0}$ denotes the length, along the Y axis, of the recessed and protruding structure unit on which light from the light source is incident, $$L_{X-0} \times F_{X-ave} \geq 10$$

and $$L_{Y-0} \times F_{Y-ave} \geq 10,$$

preferably $$L_{X-0} \times F_{X-ave} \geq 15$$

and $$L_{Y-0} \times F_{Y-ave} \geq 15 \text{ are satisfied.}$$

Furthermore, the illumination apparatus of the present disclosure and the like including the above-described preferred forms can be configured such that $F_{X-ave} \neq F_{Y-ave}$.

Furthermore, the illumination apparatus of the present disclosure and the like including the above-described preferred forms can be configured such that the recessed and protruding structure unit has a kurtosis β (kurtosis $β_X$ along the X axis and kurtosis $β_Y$ along the Y axis) of −0.5 or less, preferably −0.8 or less. Note that the kurtosis is defined in JIS Z8101-1: 2015 (ISO 3534-1: 2006).

Furthermore, the illumination apparatus of the present disclosure and the like including the above-described preferred forms can be configured such that light from the light source is incident on each recessed and protruding structure unit in a rotating state from a first surface of each recessed and protruding structure unit, the light from the light source is emitted from a second surface of each recessed and protruding structure unit toward the integrator, and the first surface of each recessed and protruding structure unit is provided with the recessed and protruding portion, whereas the second surface of each recessed and protruding structure unit is flat, or such that the first surface of each recessed and protruding structure unit is flat, and the second surface of each recessed and protruding structure unit is provided with the recessed and protruding portion, or such that the first surface of each recessed and protruding structure unit is provided with the recessed and protruding portion, and the second surface of each recessed and protruding structure unit is also provided with the recessed and protruding portion.

Alternatively, the illumination apparatus of the present disclosure and the like including the above-described preferred forms can be configured such that:

light from the light source is incident on each recessed and protruding structure unit in the rotating state from the first surface of each recessed and protruding structure unit, the light from the light source is emitted from the second surface of each recessed and protruding structure unit toward the integrator, the first surface of each recessed and protruding structure unit is provided with the recessed and protruding portion, and the second surface of each recessed and protruding structure unit is flat and constitutes a light reflection surface, and such that in this case, the illumination apparatus further includes a polarization beam splitter ad a quarter wavelength plate, and light from the light source enters the polarization beam splitter, exits the polarization beam splitter along a first direction, passes through the quarter wavelength plate, is reflected at the recessed and protruding structure unit, passes through the quarter wavelength plate, enters the polarization beam splitter, exits the polarization beam splitter along a second direction different from the first direction, and enters the integrator.

The illumination apparatus or the optical element of the present disclosure can be configured such that the cross-sectional shape of light incident on the recessed and protruding structure unit or the optical element is, though not limited to, a circle or an ellipse.

Examples of a material constituting the optical member or the optical element or a substrate described below can include polyethylene terephthalate, polyethylene naphthalate, polycarbonate, a cellulose ester such as cellulose acetate, a fluorine polymer such as a copolymer of polyvinylidene fluoride or polytetrafluoroethylene and hexafluoro propylene, a polyether of polyoxymethylene or the like, polyacetal, polystyrene, polyethylene, polypropylene, polyolefin such as a methylpentene polymer, polyimide such as polyamide-imide or polyetherimide, polyamide, polyether sulfone, polyphenylene sulfide, polyvinylidene fluoride, tetraacetylcellulose, bromized phenoxy, polyarylate, polysulfone, a silicone-based resin (for example, a methyl silicone resin, a methylphenyl silicone resin, or a propylphenyl silicone resin), and the like. In a case where the optical member or the optical element includes glass, the glass can be transparent glass such as soda lime glass or a white glass plate.

The first surface of each recessed and protruding structure unit and/or the second surface facing the first surface is provided with the recessed and protruding portion. However, the recessed and protruding portion is only required to be formed on one of the surfaces (for example, the first surface) of the material constituting the optical member (recessed and protruding structure unit) or the optical element. Examples of a formation method for the recessed and protruding portion include various printing methods including a screen printing method, an ink-jet printing method, and a metal mask printing method; a transfer method using a mold or the like; a nanoimprint method; a 3D printing technology (for example, a 3D printing technology using a stereolithography 3D printer or a two-photon absorption micro 3D printer; a physical vapor deposition method (for example, a PVD method including a vacuum deposition method such as an electron beam deposition method or a hot filament deposition method, a sputtering method, an ion plating method, and a laser ablation method); various chemical vapor deposition method (CVD method); a liftoff method; microfabrication technology using a pulse laser, and the like, and also include combinations of these methods with an etching method.

In the illumination apparatus of the present disclosure and the like, the recessed and protruding portions of adjacent recessed and protruding structure units are smoothly connected together, and the recessed portions and the protruding portions are smoothly connected together, or in the optical element of the present disclosure, the recessed and protruding portions are smoothly connected together. In this case, "smooth" is an analytical term. For example, in a case where the real variable function $f(x)$ is differentiable for $a<x<b$ and $f'(x)$ is continuous, the function is described as continuously differentiable or expressed as smooth. Here, when the recessed and protruding portion is expressed as $Z=f(X, Y)$, a differential value for the recessed and protruding portion (the inclination of a surface of the recessed and protruding portion obtained by cutting the surface along the X axis or an XZ virtual plane parallel to the X axis and the inclination of the surface of the recessed and protruding portion obtained by cutting the surface along the Y axis or a YZ virtual plane parallel to the Y axis) can be obtained by $\partial Z/\partial X = [\partial f(X, Y)/\partial X]_Y$ $\partial Z/\partial Y = [\partial f(X, Y)/\partial Y]_X$.

The integrator is referred to as an integrator lens or a fly eye lens, and is a lens that improves uniformity of illuminance for an irradiated surface. As the integrator in the present disclosure, an integrator with a known configuration and a known structure can be used, and specifically the integrator includes, for example, multiple lenses arranged in an array or in a two-dimensional matrix. Alternatively, the integrator includes a rod integrator.

The light source includes multiple light emitting elements with a known configuration and a known structure, for example, multiple semiconductor laser elements. The number of light emitting elements constituting the light source may be one or may be multiple. For multiple light emitting elements, the light source may be configured by arranging multiple semiconductor laser elements in an array or may be configured by using multiple semiconductor laser element units each obtained by bringing together multiple semiconductor laser elements. The semiconductor laser elements include, for example, a semiconductor laser element that emits red, a semiconductor laser element that emits green, and a semiconductor laser element that emits blue. Alternatively, the semiconductor laser elements include, for example, a semiconductor laser element that emits yellow and a semiconductor laser element that emits blue, or for example, a semiconductor laser element that emits blue and a wavelength conversion member. The array of semiconductor laser elements in the semiconductor laser element unit can include the semiconductor laser elements arranged in a straight line or on the vertexes of an equilateral triangle. The multiple semiconductor laser elements may be arrayed on the vertexes of a rectangle or on the vertexes of a regular hexagon. The semiconductor laser element can be a semiconductor laser element (edge-emitting semiconductor laser element) configured to emit laser light from an end face or can include a surface emitting laser (VCSEL).

The optical member is only required to be rotated using, for example, a driving motor.

To provide light emitted from the recessed and protruding structure unit with, for example, a rectangular external shape, in other words, to provide light emitted from the recessed and protruding structure unit in the rotating state, with a rectangular cross-sectional shape, the recessed and protruding portions are only required to be designed such that light emitted from the recessed and protruding structure unit in a non-rotating state, with a trapezoidal cross-sectional shape. In other words, the recessed and protruding portion is only required to be designed such that the external shape of light emitted from the recessed and protruding structure unit in the non-rotating state is like an isosceles trapezoid including a bottom side (rotation axis side) longer than a top side, the top side and the bottom side extending parallel to the Y axis. The relation between the value $A_1$ of (length of the bottom side)/(length of the top side) and the value $A_2$ of (outer diameter)/(inner diameter) of a fan-surface-like recessed and protruding structure unit desirably satisfies, for example, $0.85 \leq A_1/A_2 \leq 1.15$, preferably $A_1/A_2 = 1.0$.

Additionally, the illumination apparatus of the present disclosure and the like can be configured such that, when an XZ virtual plane in the recessed and protruding structure unit is a mirror plane, two areas of the recessed and protruding structure unit located across the XZ virtual surface are in a mirror symmetry relation, and the recessed and protruding portions in the two areas are smoothly connected together.

EXAMPLE 1

Figure 4:
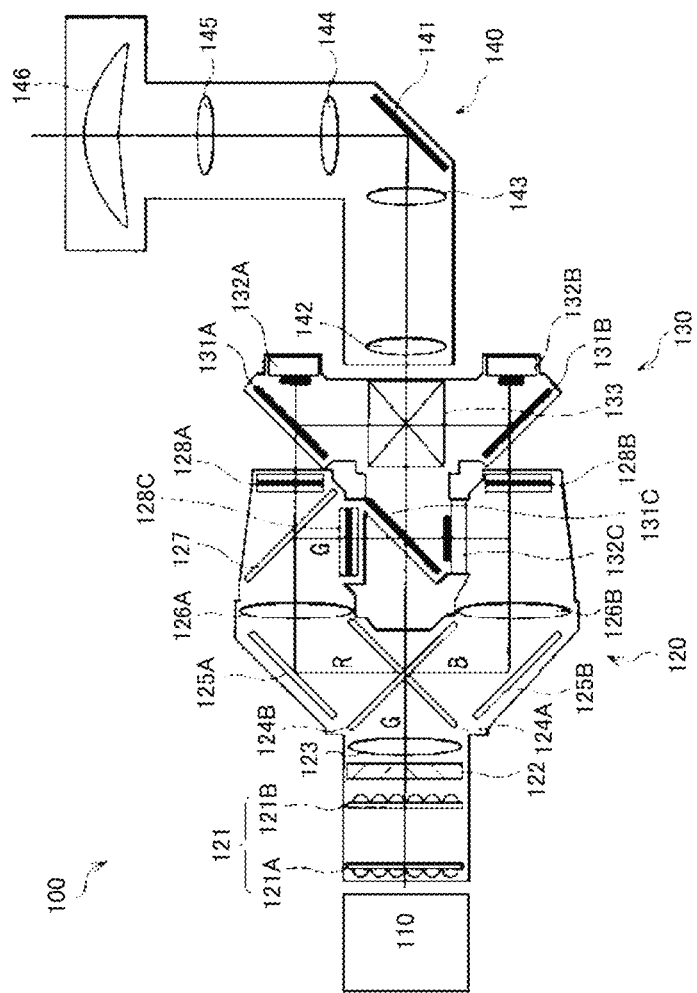
FIG. 4 is a conceptual drawing of a projective display apparatus (projector) of the present disclosure.
Figure 5:
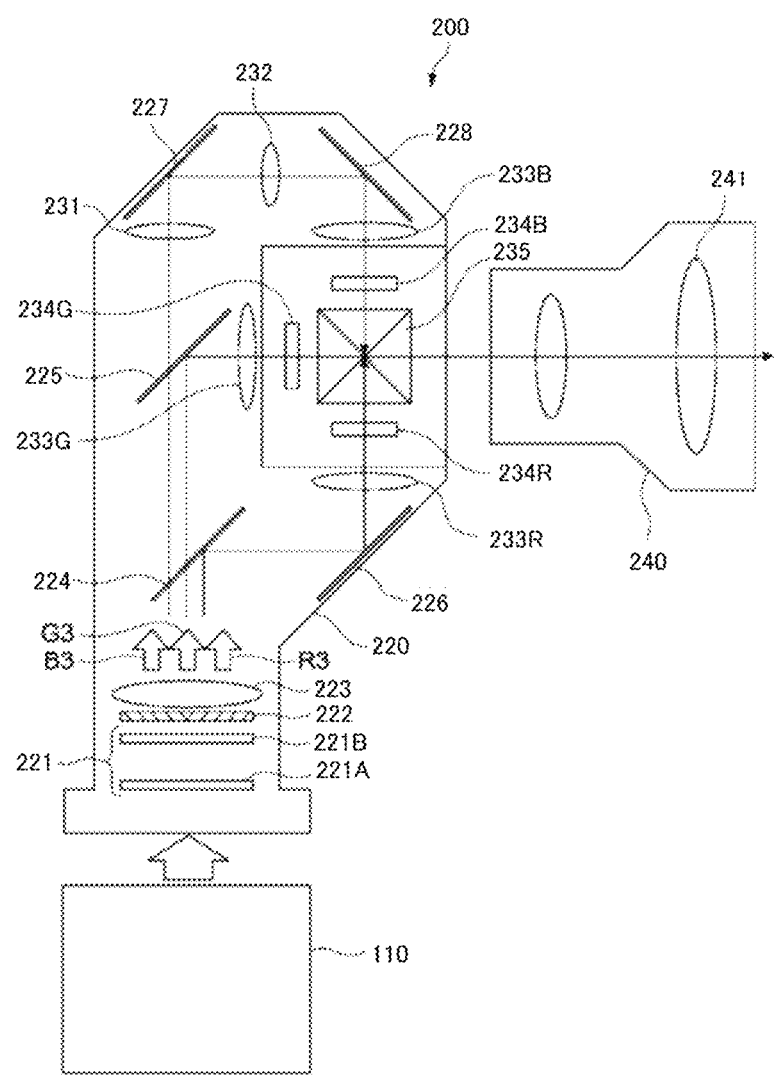
FIG. 5 is a conceptual drawing of a modified example of the projective display apparatus (projector) of the present disclosure.

Example 1 relates to the optical element, the illumination apparatus (light source apparatus), and the projective display apparatus (projector) of the present disclosure. FIG. 1 depicts a conceptual drawing of the illumination apparatus of Example 1, FIGS. 4 and 5 depict conceptual drawings of the projective display apparatus (projector) of Example 1 and a modified example of the projective display apparatus, FIGS. 6A and 6B depict a schematic plan view and a schematic cross-sectional view of an optical member constituting the illumination apparatus of Example 1, FIG. 7 depicts a partly enlarged schematic partial plan view of the optical member constituting the illumination apparatus of Example 1, and FIGS. 8B and 8A depict a schematic plan view and a partly enlarged schematic partial plan view of the optical member constituting the illumination apparatus of Example 1.

Note that, in the illumination apparatus of the embodiment, the X axis refers to an axis extending through the center and the rotation axis of the recessed and protruding structure unit and located in the surface of the recessed and protruding structure unit provided with the recessed and protruding portion, the Z axis refers to an axis extending through the center of the recessed and protruding structure unit and that is parallel to the rotation axis, and the Y axis refers to an axis that is orthogonal to the X axis and the Z axis and that is located in the surface of the recessed and protruding structure unit provided with the recessed and protruding portion. In the optical member, the number of X axes, the number of Y axes, and the number of Z axes are each equal to the number of the recessed and protruding structure units. Additionally, a ζ axis refers to any axis that is orthogonal to the rotation axis and that is located in the surface of the recessed and protruding structure unit provided with the recessed and protruding portion, and a η axis refers to any axis that is orthogonal to the rotation axis AR and the ζ axis and that is located in the surface of the recessed and protruding structure unit provided with the recessed and protruding portion.

The illumination apparatus of Example 1 depicted in FIG. 1 includes
- a light source 10,
- an optical member 20 including a first surface 20A on which light from the light source 10 is incident and a second surface 20B facing the first surface 20A, and
- an integrator 30 on which light emitted from the optical member 20 is incident.

Figure 6A:
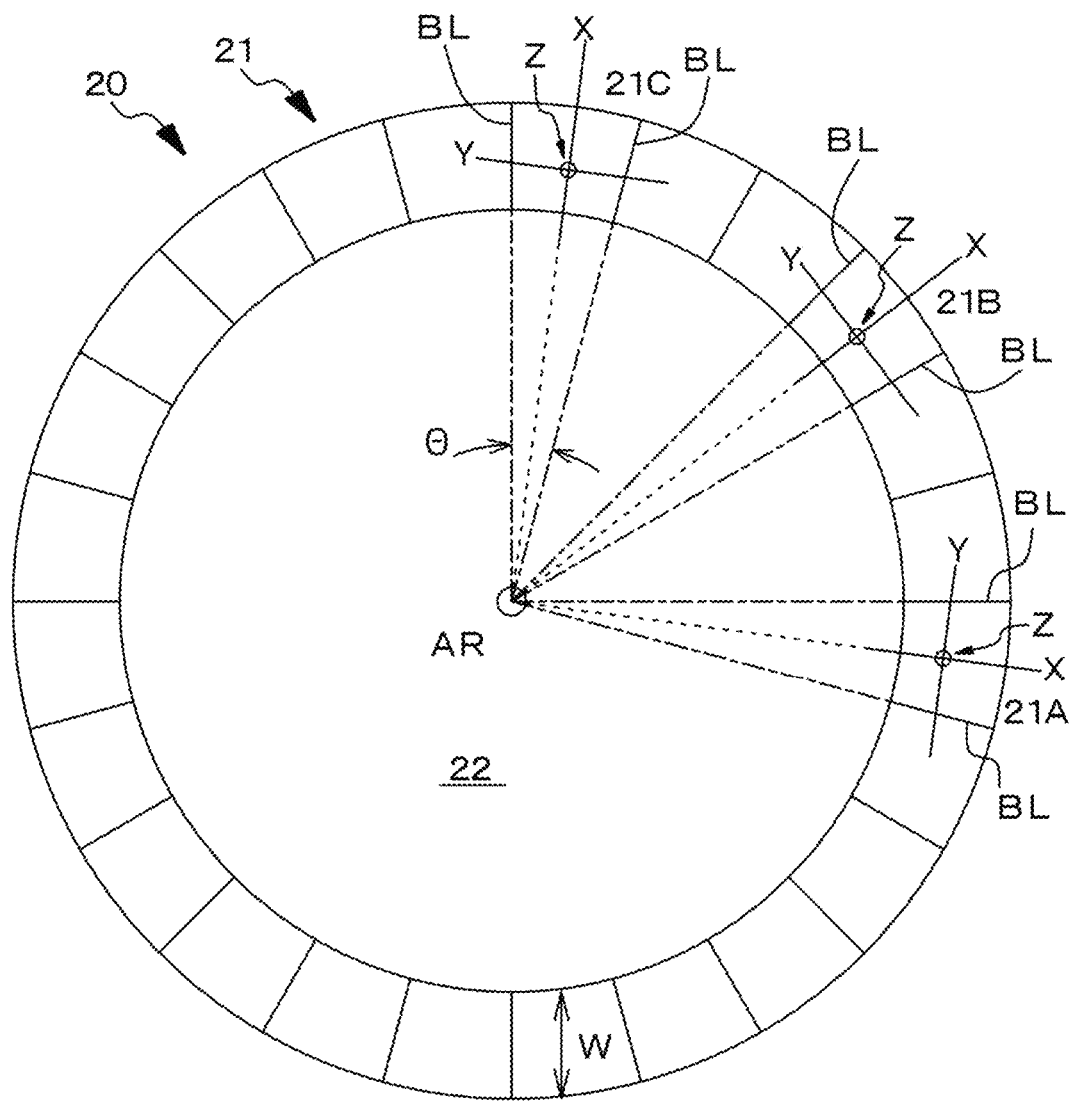
FIG. 6A and FIG. 6B are a schematic plan view and a schematic cross-sectional view of an optical member constituting an illumination apparatus of Example 1.
Figure 6B:
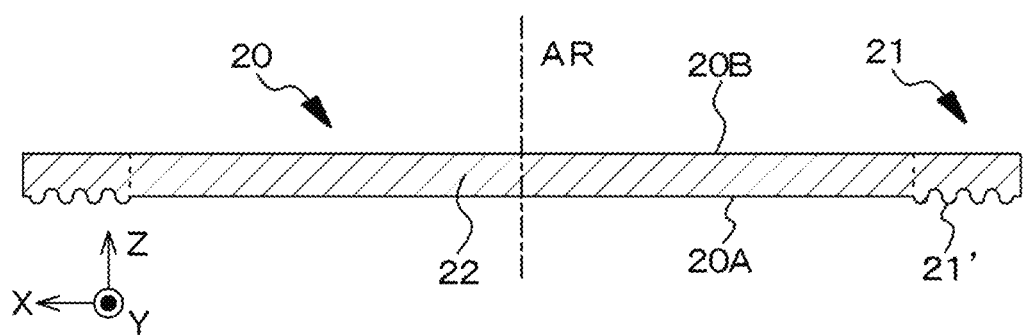
Figure 7:
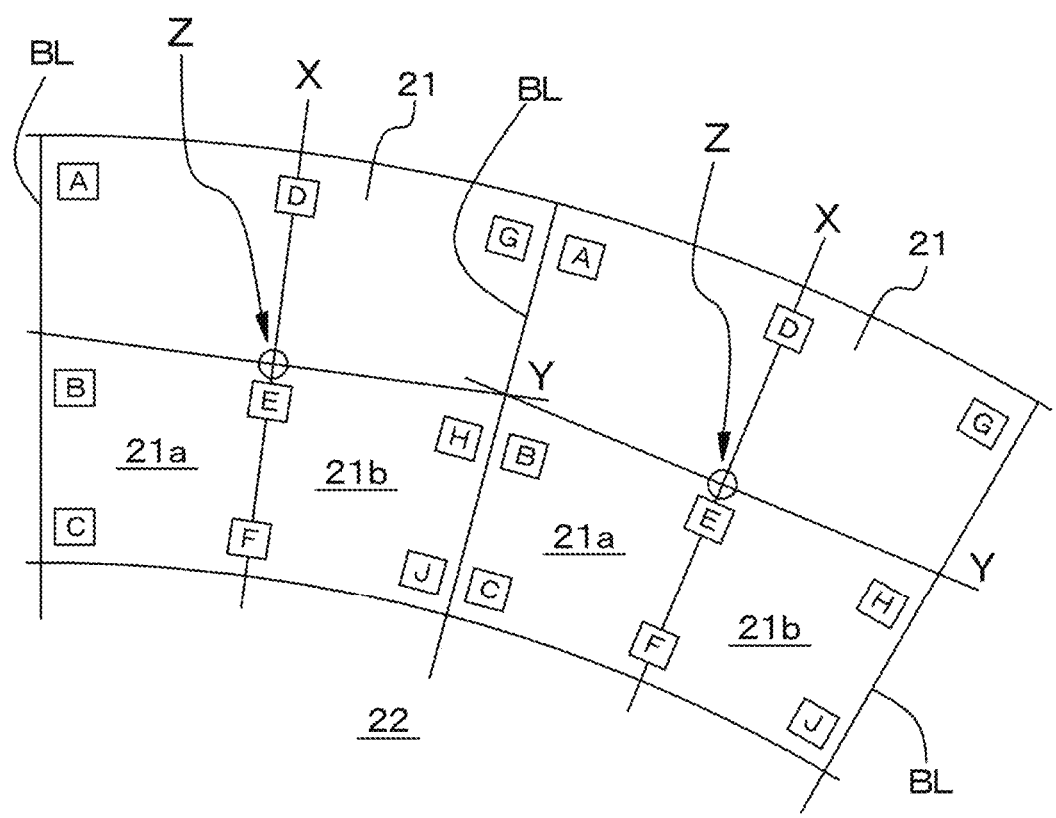
FIG. 7 is a partly enlarged, schematic partial plan view of the optical member constituting the illumination apparatus of Example 1.
Figure 8A:
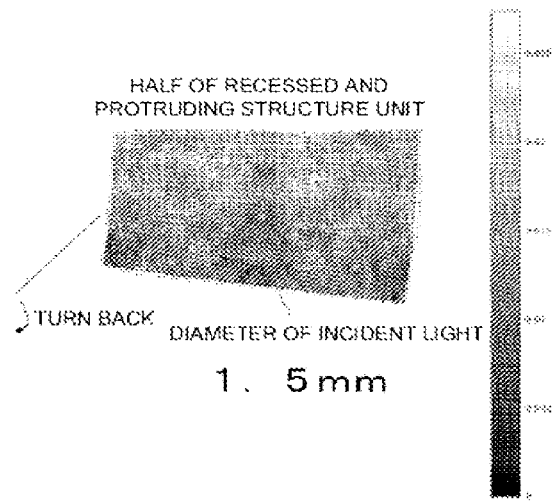
FIG. 8A and FIG. 8B are a partly enlarged schematic partial plan view and a partly enlarged schematic plan view of the optical member constituting the illumination apparatus of Example 1.
Figure 8B:
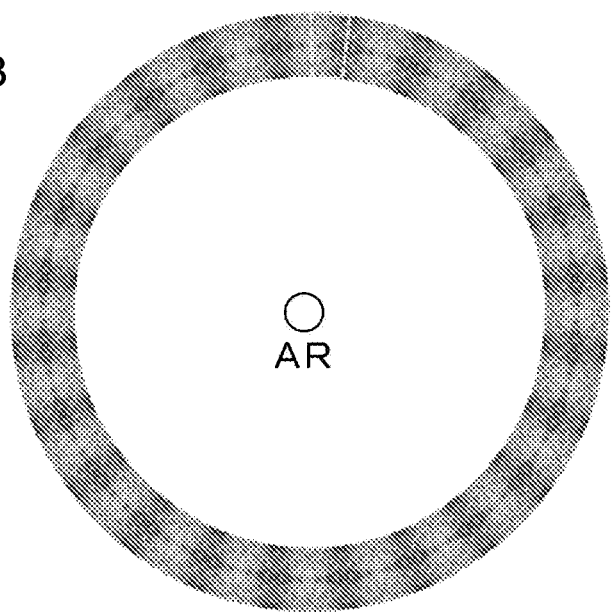

As depicted in FIGS. 6A and 8B, the optical member 20
- is rotatable around the rotation axis AR extending parallel to a direction in which light from the light source 10 is incident on the optical member 20 and is emitted from the optical member 20,
- as depicted in FIGS. 6A and 8B, the planar shape of the optical member 20 (planar shape of the optical member 20 obtained by cutting the optical member 20 along a virtual plane orthogonal to the rotation axis AR) is annular around the rotation axis AR,
- as depicted in FIG. 6B, the first surface 20A or the second surface 20B of the optical member 20 (the first surface 20A in the depicted example) is provided with multiple recessed and protruding structure units 21 each having a fan-surface-like planar shape and including a recessed and protruding portion 21',
- as depicted in FIG. 6A, an extended line of a boundary BL between adjacent recessed and protruding structure units 21 intersects the rotation axis AR,
- as depicted in FIGS. 6A, 7, and 8B, when the boundary BL between the adjacent recessed and protruding structure units 21 is a mirror plane, the adjacent recessed and protruding structure units 21 are in a mirror symmetry relation, that is, the recessed and protruding portions in the adjacent recessed and protruding structure units 21 are in the mirror symmetry relation, and the recessed and protruding portions 21' of the adjacent recessed and protruding structure units 21 are smoothly connected together,
- the recessed portions and the protruding portions in the recessed and protruding portion 21' of each recessed and protruding structure unit 21 are smoothly connected together, and
- an area of each recessed and protruding structure unit 21 occupied by the recessed and protruding portion 21' is larger in size than incident light from the light source 10.

Note that FIG. 8B depicts half of one recessed and protruding structure unit 21 by sandwiching the half between white dotted lines and that FIG. 8A depicts this portion in an enlarged manner.

Here, as depicted in FIG. 7, a part of the recessed and protruding portion 21' with a predetermined shape is formed in each of an area A, an area B, an area C, an area D, an area E, an area F, an area G, an area H, and an area J of the recessed and protruding structure unit 21. FIG. 7, depicting two recessed and protruding structure units 21, schematically illustrates the arrangement of the area A, the area B, the area C, the area D, the area E, the area F, the area G, the area H, and the area J. In the depicted example, the optical member 20 is provided with 24 recessed and protruding structure units 21. The optical member 20 includes a disc-shaped substrate 22 including a polymethylmethacrylate (PMMA) resin with a refractive index $n_d$=1.5, and the optical member 20 (recessed and protruding structure unit 21) is formed on an outer circumferential portion of the substrate 22. The center of the substrate 22 is attached to a driving motor 23, and rotation of the driving motor 23 rotates the optical member 20 (recessed and protruding structure unit 21) formed on the outer circumferential portion of the substrate 22. A rotation axis of the driving motor 23 corresponds to the rotation axis AR. In the examples, the substrate 22 has a diameter of 40 mm, and the annular optical member 20 has an outer diameter of 40 mm and an inner diameter of 32 mm. The fan-surface-like recessed and protruding structure unit 21 has a central angle (Θ) of 15 degrees and a width (W) of 4 mm. For the recessed and protruding portion 21' of the recessed and protruding structure unit 21, a mold is produced by 3D printing or laser lithography, and the recessed and protruding portion 21' is formed on the basis of an injection molding method. The recessed and protruding portion 21' has a maximum depth of 27 μm. Light (with a circular cross-sectional shape) incident on the recessed and protruding portion 21' in the recessed and protruding structure unit 21 has a diameter of 1.5 mm.

Note that, when an XZ virtual plane in the recessed and protruding structure unit 21 is a mirror plane, two areas 21a and 21b (see FIG. 7) of the recessed and protruding structure unit 21, located across the XZ virtual plane, are in the mirror symmetry relation, that is, in the two areas 21a and 21b, the recessed and protruding portions 21' are in the mirror symmetry relation and are smoothly connected together. Specifically, between the area A and the area G, between the area B and the area H, and between the area C and the area J, the recessed and protruding portions 21' are in the mirror symmetry relation when the XZ virtual plane is a mirror plane. Additionally, in the area D, the area E, and the area F, the recessed and protruding portions 21' are smoothly connected together across the XZ virtual plane. In addition, the area G, area H, and area J in the area 21b of a certain recessed and protruding structure unit 21 are in the mirror symmetry relation with the area A, area B, and area C in the area 21a of the recessed and protruding structure unit 21 adjacent to the certain recessed and protruding structure unit 21 when the boundary BL in the recessed and protruding structure unit 21 is a mirror plane, and the area A and the area G are smoothly connected together, the area B and the area H are smoothly connected together, and the area C and the area J are smoothly connected together.

A projective display apparatus (projector) of Example 1 or Examples 2 and 3 described below includes, as depicted in FIG. 4 or FIG. 5,
- an illumination apparatus 110 including the light source 10, the optical member 20 on and from which light from the light source 10 is incident and is emitted, and the integrator 30 on which light from the optical member 20 is incident,
- an optical modulation apparatus (image forming unit 130) that modulates light emitted from the illumination apparatus 110 on the basis of image information, and
- a projective optical system 140 that projects an image from the optical modulation apparatus (image forming unit 130).

The illumination apparatus includes an illumination apparatus of Example 1 or Examples 2 and 3 described below. The projective display apparatus (projector) will be described below.

Furthermore, an optical element of Example 1 or Example 2 described below corresponds to one recessed and protruding structure unit 21 in the illumination apparatus of Example 1 or Example 2 described below, and includes
- a first surface 20A and a second surface 20B facing the first surface 20A, light being incident on the first surface 20A, the light being applied by the light source 10 emitting light with multiple wavelengths, the first surface 20A or the second surface 20B (specifically, the first surface 20A) is provided with the recessed and protruding portion 21' that refracts incident light from the light source 10, an area occupied by the recessed and protruding portion 21' is larger in size than the incident light from the light source 10, recessed portions and protruding portions on the recessed and protruding portion 21' are smoothly connected together, and when the shape of light obtained by cutting the light along a virtual plane orthogonal to a traveling direction of light is referred to as the cross-sectional shape of light (this also applies to the description below), the cross-sectional shape of light emitted from the optical element is like a rectangle or a polygon or a shape with one or more angle (shape with one or more point for which differential is impossible). In other words, the cross-sectional shape of light emitted from the optical element is a shape other than a circle or an ellipse, or in other words, light incident on the optical element from the light source 10 has a cross-sectional shape different from that of light emitted from the optical element.

The light source 10 includes multiple light emitting elements emitting red (specifically, semiconductor laser elements 10R), multiple light emitting elements emitting green (specifically, semiconductor laser elements 10G), multiple light emitting elements emitting blue (specifically, semiconductor laser elements 10B), a dichroic prism 12 that brings together red laser light, green laser light, and blue laser light emitted from the light emitting elements (semiconductor laser elements 10R, 10G, and 10B), and a lens system 13 that condenses white light from the dichroic prism 12 into a partial area of the recessed and protruding structure unit 21. Note that red laser light emitted from the multiple red semiconductor laser elements 10R is temporarily collimated into substantially parallel beams by a lens 11R, green laser light emitted from the multiple green semiconductor laser elements 10G is temporarily collimated into substantially parallel beams by a lens 11G, and blue laser light emitted from the multiple blue semiconductor laser elements 10B is temporarily collimated into substantially parallel beams by a lens 11B. Then, the laser light beams are color-multiplexed in the dichroic prism 12, and the resultant white laser light is condensed into the recessed and protruding structure unit 21 in a rotating state via the lens system 13.

The laser light incident on the recessed and protruding structure unit 21 is subjected to predetermined refraction in the recessed and protruding structure unit 21 in the rotating state, and the resultant laser light is emitted from the recessed and protruding structure unit 21. The white laser light beams emitted from the recessed and protruding structure unit 21 pass through a condenser lens 24 to reduce the incident angle to an integrator 30, and the resultant white laser light beams are incident on the integrator 30 at the resultant incident angle. The integrator 30 is also referred to as an integrator lens or a fly eye lens and includes multiple lenses arrayed in a two-dimensional matrix. Then, the white laser light emitted from the integrator 30 travels toward a light valve (optical modulation apparatus or image forming unit 130 described below).

Figure 3:
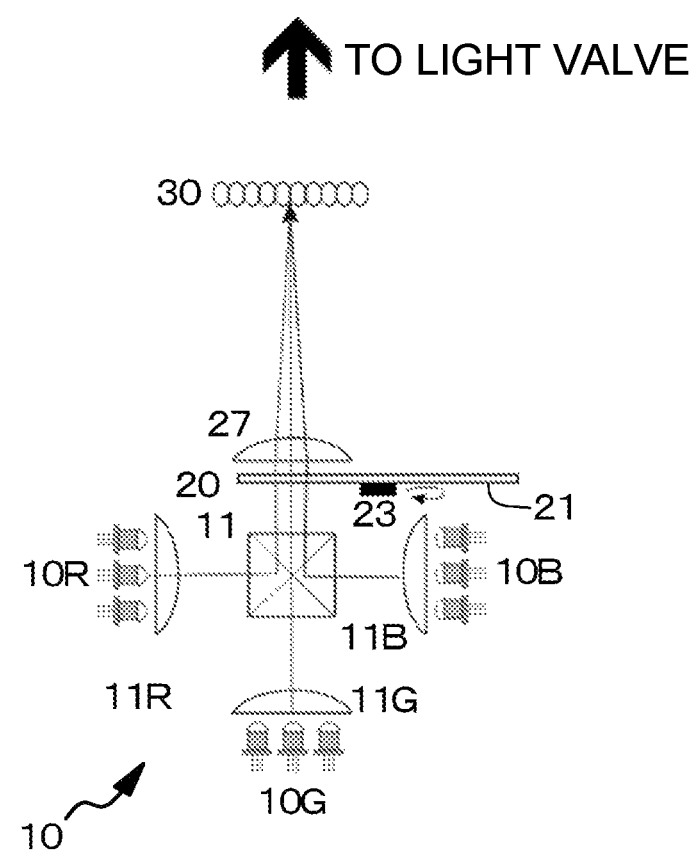
FIG. 3 is a conceptual drawing of an illumination apparatus of Example 3.

In the illumination apparatus of Example 1 depicted in FIG. 1 or the illumination apparatus of Example 3 depicted in FIG. 3 described below, light from the light source 10 is incident on each recessed and protruding structure unit 21 in the rotating state from the first surface 20A of each recessed and protruding structure unit 21 and is emitted from the second surface 20B of each recessed and protruding structure unit 21 toward the integrator 30, the first surface 20A of each recessed and protruding structure unit 21 is provided with the recessed and protruding portion 21', and the second surface 20B of each recessed and protruding structure unit 21 is flat. Note that the recessed and protruding portion 21' may be formed on the second surface 20B of the optical member 20 or may be formed on the first surface 20A and the second surface 20B of the optical member 20.

As described above, in the illumination apparatus of Example 1, the recessed and protruding portion 21' refracts incident light from the light source 10. Additionally, the light source 10 emits light with multiple wavelengths. Furthermore, light incident on the recessed and protruding structure unit 21 from the light source 10 has a cross-sectional shape different from that of light emitted from the recessed and protruding structure unit 21. Specifically, the cross-sectional shape of light emitted from the recessed and protruding structure unit 21 is like a rectangle or a polygon or a shape with one or more angles. In other words, the cross-sectional shape of light emitted from the recessed and protruding structure unit 21 is a shape other than a circle or an ellipse.

Additionally, in the illumination apparatus or the optical element of Example 1, the cross-sectional shape of light incident on the recessed and protruding structure unit 21 or the optical element from the light source 10 is a circle or an ellipse, and the cross-sectional shape of light emitted from the optical element is like a rectangle.

Figure 25A:
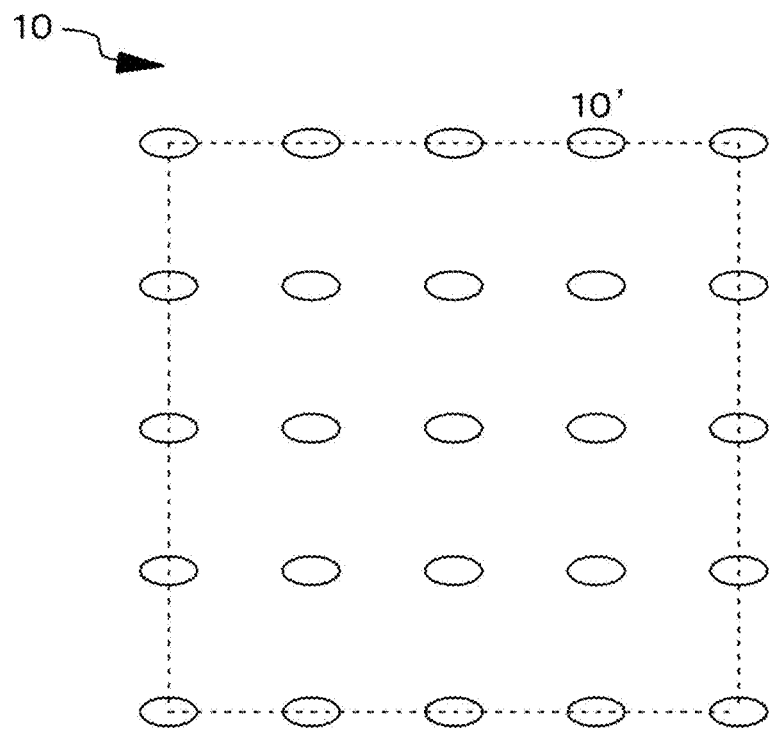
FIG. 25A and FIG. 25B are respectively a diagram schematically depicting a configuration in which multiple light emitting elements are arrayed at intersections in an orthogonal grid and a diagram schematically depicting the cross-sectional shape of light emitted from the recessed and protruding structure unit.

Furthermore, in the illumination apparatus of Example 1, as depicted in FIG. 25A, the light source 10 includes multiple light emitting elements 10' (specifically, semiconductor laser elements) arrayed in a two-dimensional matrix, and the cross-sectional shape of light emitted from the recessed and protruding structure unit 21 is approximate to the arrangement shape of the light emitting elements 10' arranged in an outermost portion of the light source 10.

Figure 25B:
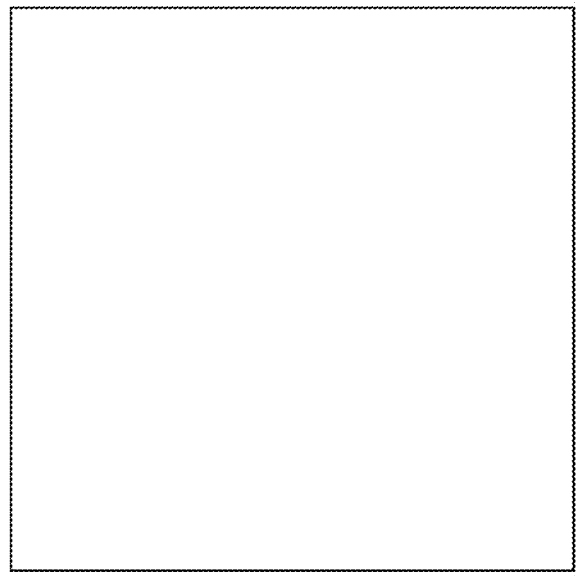

Here, in Example 1, as depicted in FIG. 25A, the multiple light emitting elements 10' are arrayed on intersections in an orthogonal grid, the arrangement shape of the multiple light emitting elements 10' arranged at the outer edge portion of the light source 10 is like a rectangle (depicted by dotted lines in FIG. 25A), and the cross-sectional shape of light emitted from the recessed and protruding structure unit 21 is like a rectangle (see FIG. 25B).

Figure 9:
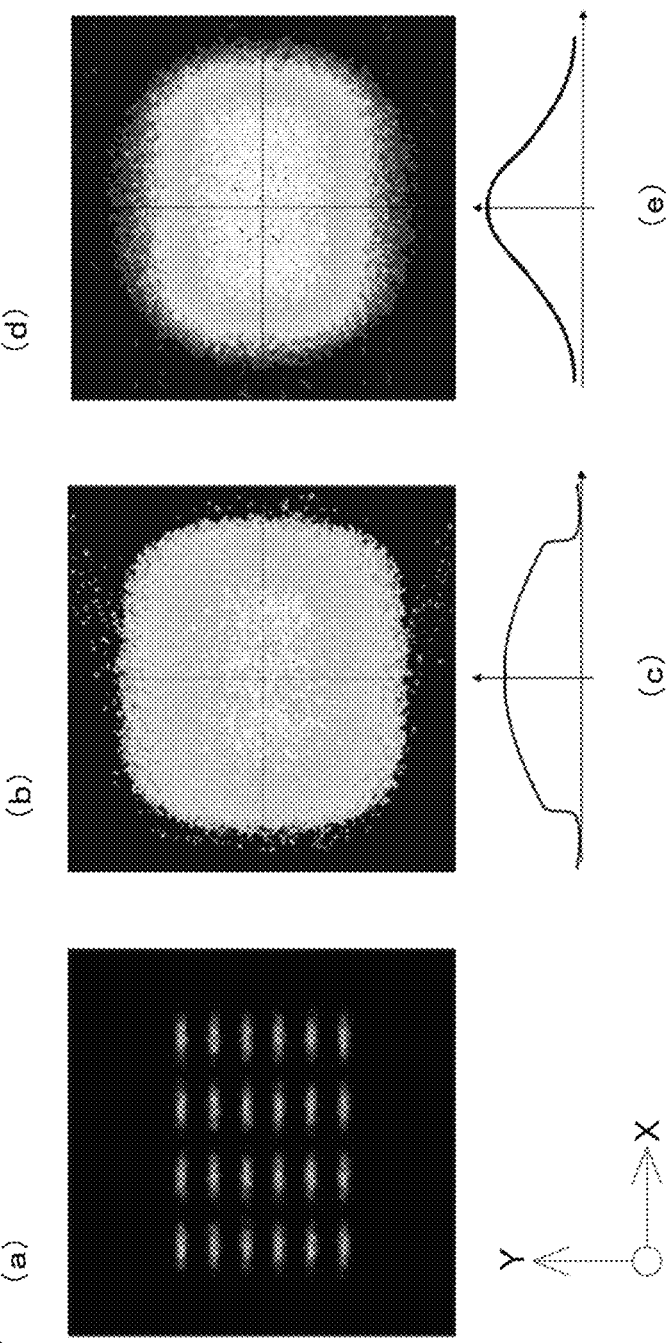
FIG. 9 (a) of FIG. 9 depicts a light position distribution on an integrator in an illumination apparatus of a reference example provided with no recessed and protruding structure units or rotary diffusion plate, (b) and (c) of FIG. 9 depict a light position distribution on an integrator in an illumination apparatus of Example 1 provided with recessed and protruding structure units, and (d) and (e) of FIG. 9 depict a light position distribution on an integrator in an illumination apparatus of Comparative Example 1 provided with a typical rotary diffusion plate.

(a) of FIG. 9 depicts a light position distribution of green light on the integrator 30 in an illumination apparatus in a reference example in which no recessed and protruding structure unit 21 or rotary diffusion plate is provided. The multiple green semiconductor laser elements 10G emitting green light, specifically, a semiconductor laser element unit including the multiple green semiconductor laser elements 10G emitting green light is arrayed in a two-dimensional matrix, and more specifically, the semiconductor laser elements are arrayed on intersections in an orthogonal grid. The cross-sectional shape of light emitted from one semiconductor laser element unit is like an ellipse.

Figure 10A:
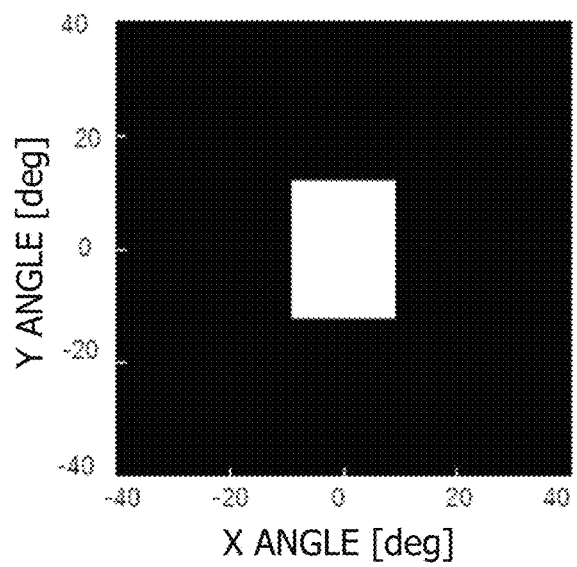
FIG. 10A depicts simulation results for a light emission angle distribution from recessed and protruding structure units in the illumination apparatus of Example 1 provided with the recessed and protruding structure units.

Additionally, (b) and (c) of FIG. 9 depict a light position distribution of green light on the integrator 30 in the illumination apparatus in Example 1 provided with the recessed and protruding structure unit 21. (b) and (c) of FIG. 9 indicate that the optical member 20 makes the light position distribution on the integrator 30 as uniform as possible (see (c) of FIG. 9) to distribute light substantially all over the integrator 30 (see (b) of FIG. 9). In other words, the cross-sectional shape of light emitted from the recessed and protruding structure unit 21 is approximate to the arrangement shape of the light emitting elements 10' arranged in the outermost portion of the light source 10. Additionally, in the optical system, the relation described below is established. Thus, the distribution of the light emission angle from the recessed and protruding structure unit 21 is similar to the light position distribution on the integrator 30, and the distribution of the light emission angle from the recessed and protruding structure unit can be considered as the light position distribution on the integrator 30. The light position distribution on the integrator≈the distribution of the light emission angle from the recessed and protruding structure unit, where a proportionality coefficient depends on the distance from the recessed and protruding structure unit to the integrator (focal length f). In a case where parallel beams are made incident on the optical member 20, simulation results indicate a rectangular distribution of light emission angle as depicted in FIG. 10A. Note that green light corresponding to light depicted in (a) of FIG. 9, distributing the light position distribution on the integrator 30, is incident on the optical member 20. (c) and (e) of FIG. 9 are light position distributions along the X axis direction corresponding to the light position distributions on the integrator 30 depicted in (b) and (d) of FIG. 9.

Figure 10B:
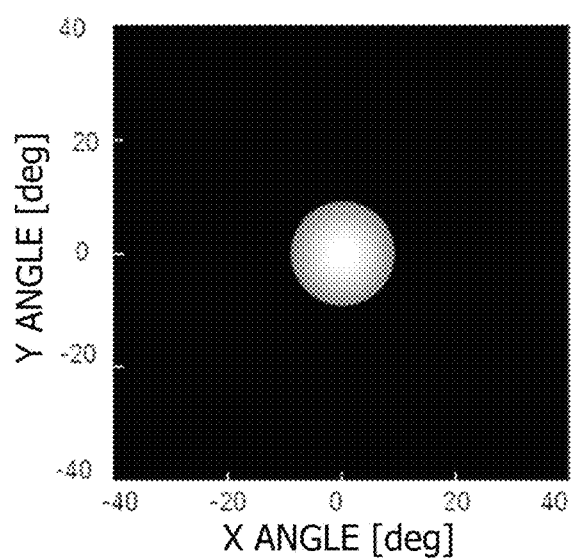
FIG. 10B depicts simulation results for a light emission angle distribution from a typical rotary diffusion plate in the illumination apparatus of Comparative Example 1 provided with the rotary diffusion plate.
Figure 11A:
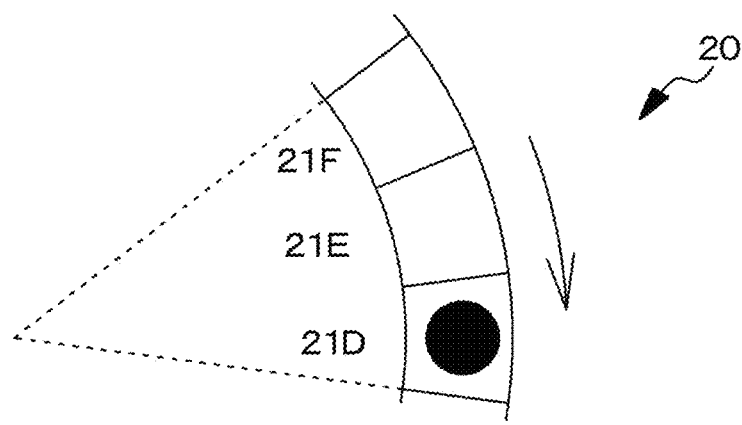
FIG. 11A, FIG. 11B, and FIG. 11C are diagrams schematically depicting light incident on a recessed and protruding structure unit in a rotating optical member.
Figure 11B:
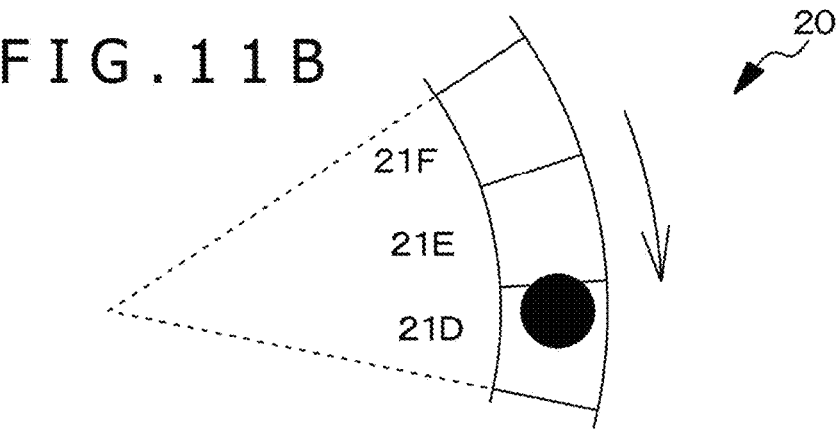
Figure 11C:
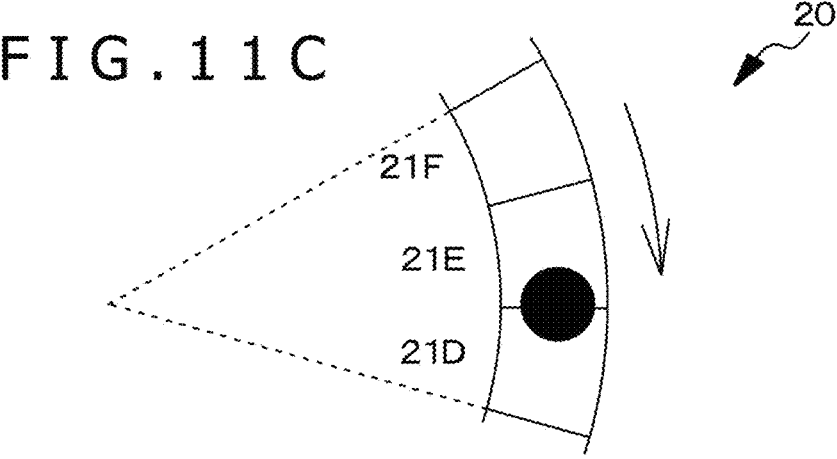
Figure 12A:
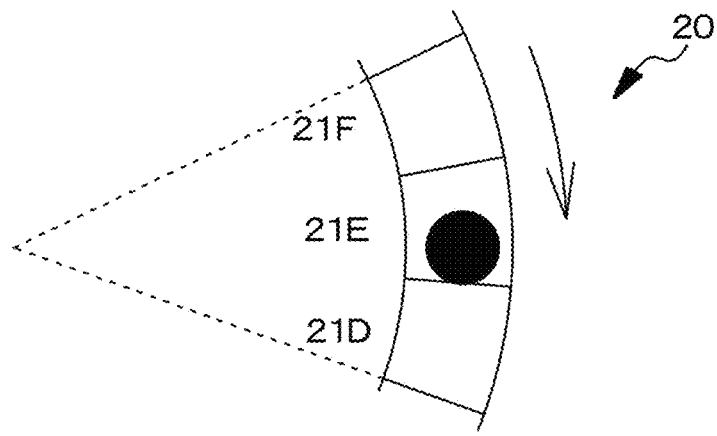
FIG. 12A, FIG. 12B, and FIG. 12C are diagrams continued from FIG. 11C and schematically depicting light incident on the recessed and protruding structure unit in the rotating optical member.
Figure 12B:
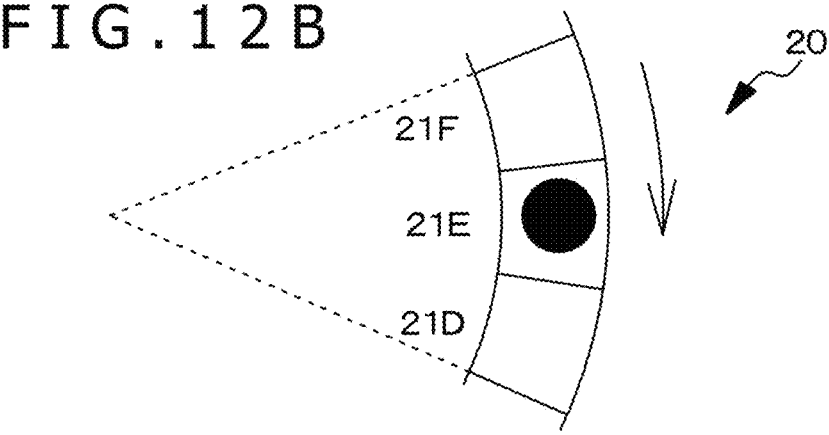
Figure 12C:
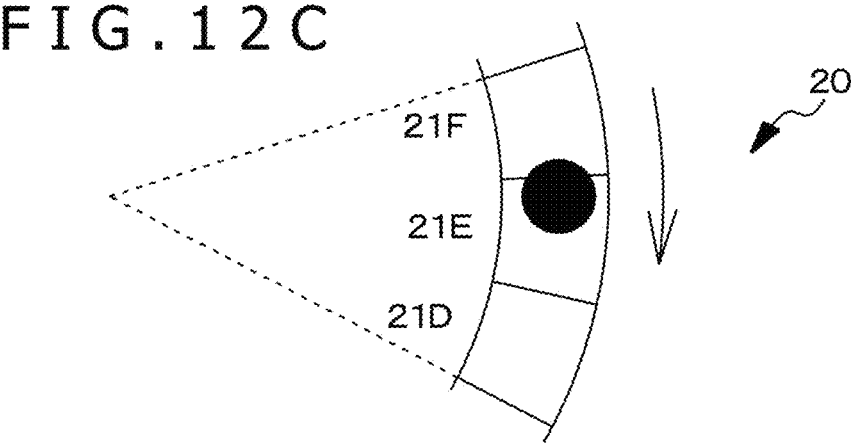

Here, the horizontal axis "X angle (unit: deg)" in FIG. 10A and FIG. 10B indicates the emission angle of light emitted from the center of the recessed and protruding structure unit 21 in the X axis direction, and the vertical axis "Y angle (unit: deg)" indicates the emission angle of light emitted from the center of the recessed and protruding structure unit 21 in the Y axis direction.

Furthermore, (d) of FIG. 9 depicts a light position distribution of green light on the integrator 30 in an illumination apparatus in Comparative Example 1 which is provided with a typical rotary diffusion plate instead of the optical member 20 for comparison. In a case where parallel beams are made incident on a typical rotary diffusion plate, simulation results indicate a circular distribution of light emission angle as depicted in FIG. 10B. Note that green light corresponding to light depicted in (a) of FIG. 9, depicting the light position distribution on the integrator 30, is incident on the optical member 20. Note that green light corresponding to light depicted in (a) of FIG. 9, depicting the light position distribution on the integrator 30, is incident on the rotary diffusion plate. In a case where a typical rotary diffusion plate is used, the light position distribution is a Gaussian distribution (see (e) of FIG. 9). Thus, the distribution of light on the integrator 30 is elongate in the vertical direction and is biased in the central portion (see (d) of FIG. 9).

Results similar to those depicted in (a) of FIG. 9, (b) of FIG. 9, (c) of FIG. 9, (d) of FIG. 9, (e) of FIGS. 9, 10A, and 10B were obtained when the multiple red semiconductor laser elements 10R emitting red and the multiple blue semiconductor laser elements 10B emitting blue were used.

Table 1 indicates simulation results for a speckle contrast level in the illumination apparatus in Example 1 and the illumination apparatus in Comparative Example 1. Note that the speckle contrast level in the illumination apparatus in Comparative Example 1 is "100."

<Table 1>
Simulation Results for Speckle Contrast Level

Example 1: 85

Comparative Example 1: 100

Table 1 indicates that the use of the illumination apparatus in Example 1 enables the speckle contrast to be significantly reduced. The results indicate that the use of the illumination apparatus in Example 1 made the light position distribution on the integrator 30 more uniform. Furthermore, illumination simulation indicates that loss of light passing through the illumination apparatus in Example 1 is 0.1% and that as depicted in (b) of FIG. 9, speckle noise can be further reduced with light vignetting prevented and with an appropriate light amount maintained. In addition, the light distribution on the integrator 30 is more uniform, enabling color unevenness in the illumination of the light valve to be reduced.

As depicted in FIGS. 11A, 11B, 11C, 12A, 12B, and 12C, the position of the incidence, on the optical member 20, of light from the light source 10 remains unchanged, but rotation of the optical member 20 sequentially changes the recessed and protruding structure unit 21 on which light traveling from the light source 10 to the optical member 20 is incident, from the recessed and protruding structure unit 21D to the recessed and protruding structure unit 21E and then to the recessed and protruding structure unit 21F. Note that the position of light incidence on the recessed and protruding structure unit 21 is depicted by a filled circle but that light is incident on a trajectory resulting from relative rotation of the filled circle around the rotation axis AR. However, light emitted from the recessed and protruding structure unit 21 has a cross-sectional shape as depicted in (b) of FIG. 9, leading to no change in the light position distribution on the integrator 30. This is because a desired light emission angle distribution is obtained by sufficient overlap between light emission angle distributions in each recessed and protruding structure unit 21 or across the recessed and protruding structure units 21, the overlap being caused by refraction.

Figure 13:
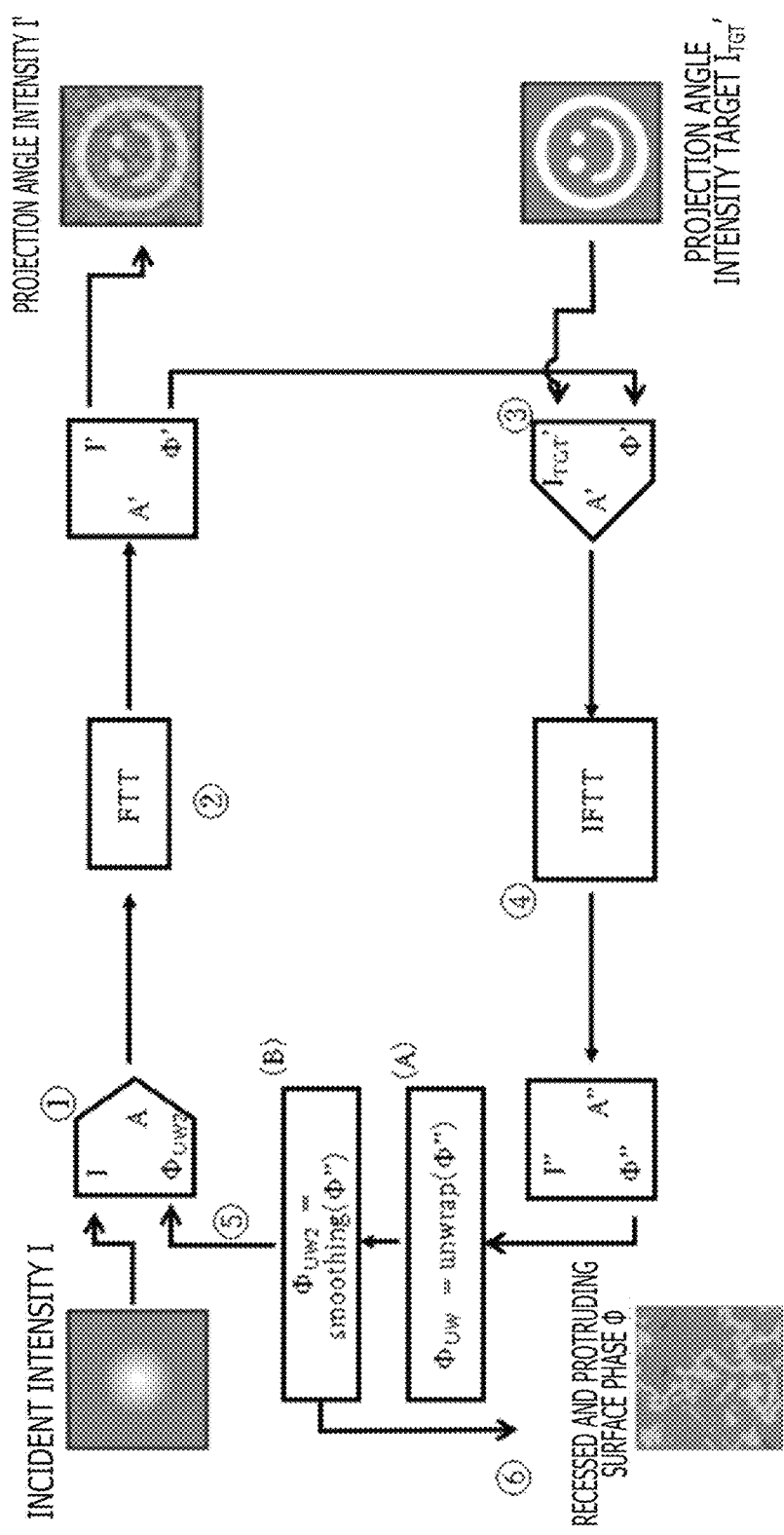
FIG. 13 is a diagram illustrating a Gerchberg-Saxton method.

In the illumination apparatus of Example 1, the recessed and protruding portion 21' of the recessed and protruding structure unit 21 is designed in accordance with a Gerchberg-Saxton method (GS method), which is known as a design method for diffraction grating. In Example 1, unwrapping processing and smoothing processing are added to a known GS method. FIG. 13 depicts a conceptual drawing of the design method. Specifically, a light electric field A is given as follows by multiplying an incident light intensity I with a random phase Φ.

$$A = I^{1/2} \cdot \exp(i \cdot \Phi)$$

Then, Fourier transform (FET) is applied to the light electric field A to determine a light electric field A' obtained during emission from the recessed and protruding structure.

Then, only a light phase Φ' is taken out from the light electric field A' determined and is multiplied by a desired light intensity distribution $I'_{TGT}$ for emission to determine a light electric field A' obtained during emission as follows.

$$A' = I^{1/2}_{TGT} \cdot \exp(I \cdot \Phi')$$

Then, inverse Fourier transform (IFET) is applied to the light electric field A' determined to obtain a phase Φ". The known GS method provides a discontinuous phase amount. On the other hand, in design of the recessed and protruding portion 21' of the recessed and protruding structure unit 21 in Example 1, unwrapping processing and phase smoothing processing (see steps (A) and (B) in FIG. 13) are subsequently introduced into the GS method to obtain a continuous phase $\Phi_{UW2}$. Then, the light intensity I and the phase $\Phi$ are replaced using the phase $\Phi_{UW2}$ subjected to unwrapping processing and phase smoothing processing, and Fourier transform (FET), inverse Fourier transform (IFET), unwrapping processing, and phase smoothing processing are repeated to gradually change the phase amount. Then, a design phase (specifically, the recessed and protruding portion 21' of the recessed and protruding structure unit 21) is finally obtained. Thus, wavelength dependence can be suppressed, and substantially equivalent light emission angle control can be performed on all of red light, green light, and blue light.

Figure 14:
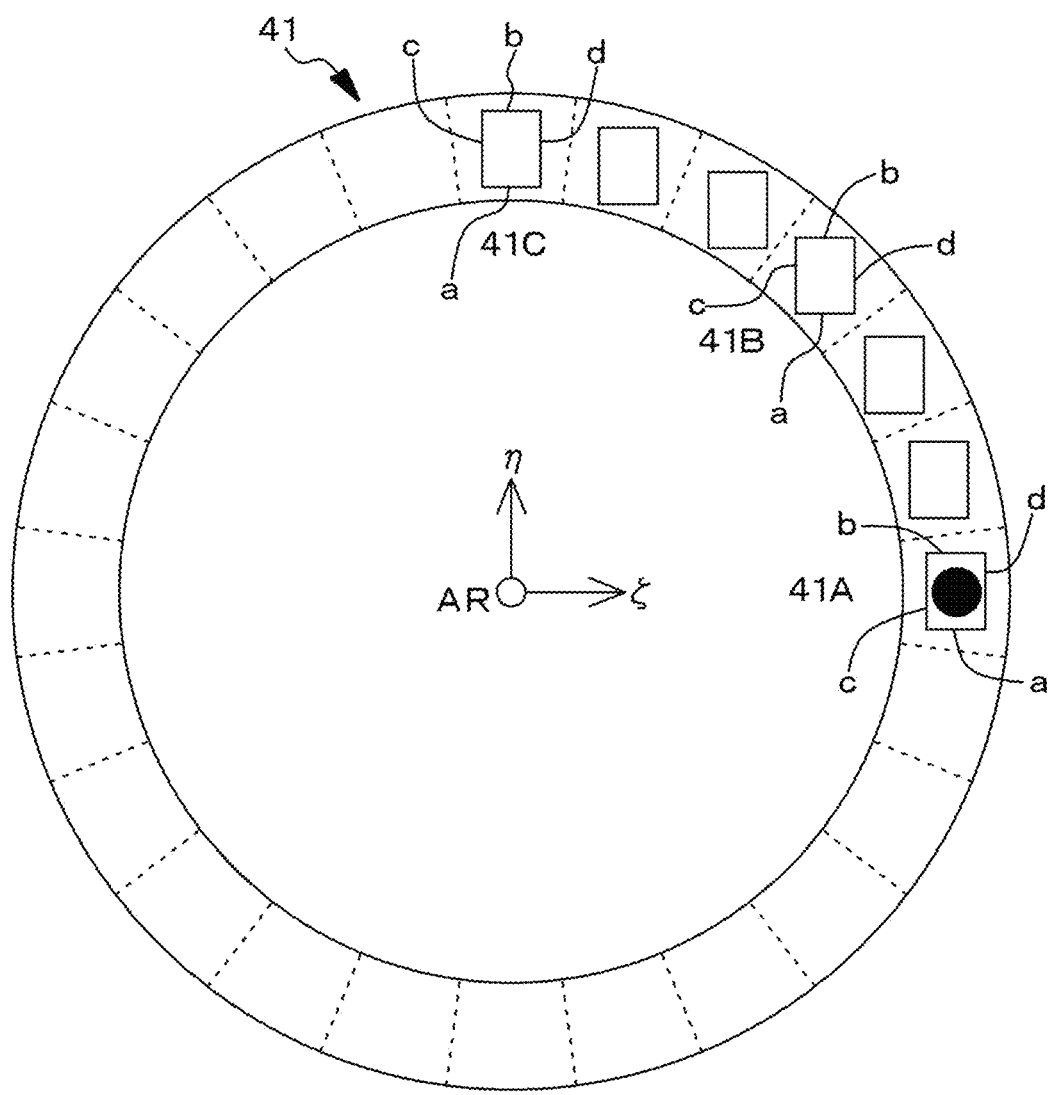
FIG. 14 is a schematic plan view of an optical member in a case where a recessed and protruding structure unit having a depth distribution of a recessed and protruding portion obtained by the Gerchberg-Saxton method has a rectangular planar shape.
Figure 15:
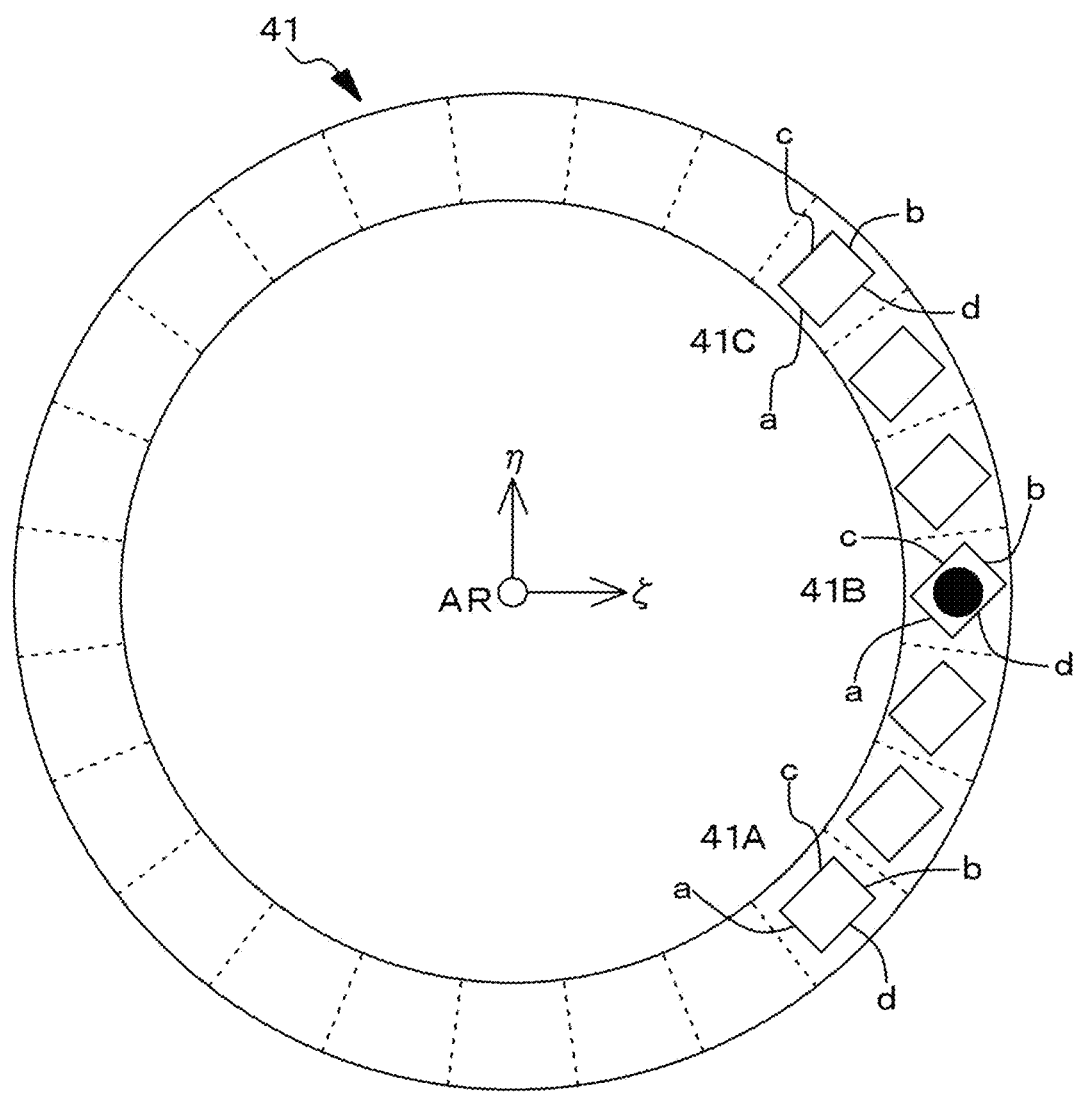
FIG. 15 is a schematic plan view of the optical member depicted in FIG. 14 and rotated by 45 degrees.
Figure 16:
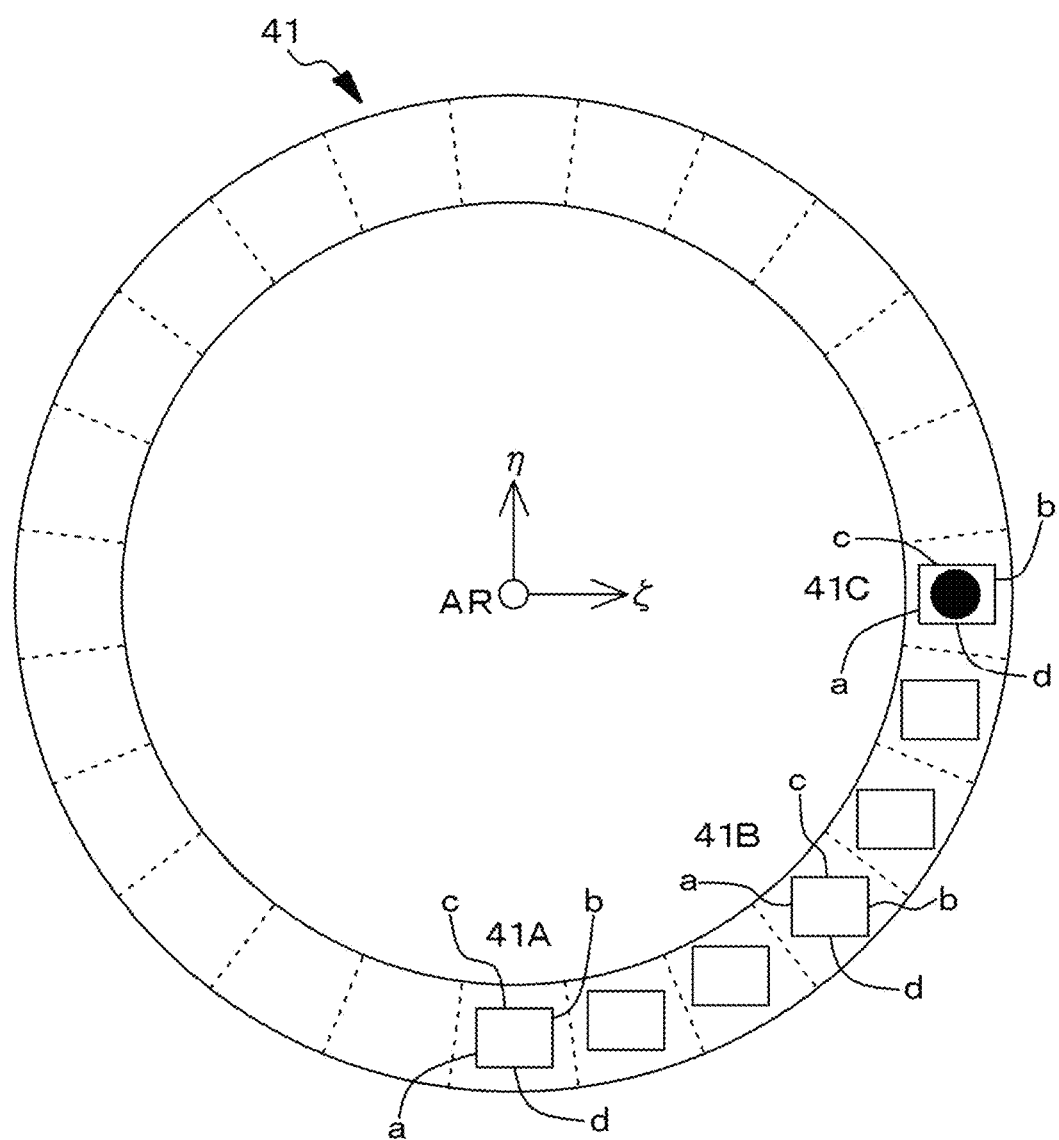
FIG. 16 is a schematic plan view of the optical member depicted in FIG. 14 and rotated by 90 degrees.

However, even in a case where the cross-sectional shape of light emitted from the recessed and protruding structure unit 21 can be controlled to a rectangle by using the above-described method, the following problem is caused by rotation of the recessed and protruding structure unit 21. Specifically, the planar shape of a recessed and protruding structure unit 41 with the depth distribution of the recessed and protruding portion 21' obtained by the GS method is assumed to be like, for example, as depicted in FIG. 14, a rectangle with two opposite sides a and b extending in a direction and two other opposite sides c and d extending in a η direction. The recessed and protruding structure unit 41 is assumed to be disposed in an outer circumferential portion of the substrate 22, shaped like a disc. However, in all the recessed and protruding structure units 41, the two sides a and b extend in the ζ direction, and the two other opposite sides c and d extend in the η direction. Light is assumed to be incident on a position on the substrate 22 indicated by a filled circle and on a trajectory obtained by rotating the filled circle around the rotation axis AR. Additionally, the recessed and protruding structure unit located at an angle of 45 degrees to a certain recessed and protruding structure unit 41A is denoted by the reference numeral 41B, and the recessed and protruding structure unit located at an angle of 90 degrees to the certain recessed and protruding structure unit 41A is denoted by the reference numeral 41C. In this case, even in a case where the cross-sectional shape of light emitted from the certain recessed and protruding structure unit 41A (see FIG. 14) is like a rectangle, when light is incident on the recessed and protruding structure unit 41B, the cross-sectional shape of light emitted from the recessed and protruding structure unit 41B (see FIG. 15) is like a rectangle inclined at 45 degrees to the ζ direction. Additionally, when light is incident on the recessed and protruding structure unit 41C, the cross-sectional shape of light emitted from the recessed and protruding structure unit 41C (see FIG. 16) is like a rectangle inclined at 90 degrees to the ζ direction. In other words, the cross-sectional shape of light emitted from the recessed and protruding structure unit 41 is rotated.

On the other hand, in the optical member of Example 1 depicted in FIGS. 6A and 8B, the recessed and protruding structure unit located at 45 degrees to the certain recessed and protruding structure unit 21A is denoted by the reference numeral 21B, and the recessed and protruding structure unit located at 90 degrees to the certain recessed and protruding structure unit 21A is denoted by the reference numeral 21C. In this case, when light is incident on the recessed and protruding structure unit 21A, the cross-sectional shape of light emitted from the recessed and protruding structure unit 21A is like a rectangle as depicted in (b) of FIG. 9, when light is incident on the recessed and protruding structure unit 21B, the cross-sectional shape of light emitted from the recessed and protruding structure unit 21B is the same as that of light emitted from the recessed and protruding structure unit 21A as depicted in (b) of FIG. 9, and the cross-sectional shape of light emitted from the recessed and protruding structure unit 21C is the same as that of light emitted from the recessed and protruding structure unit 21A as depicted in (b) of FIG. 9. In other words, the cross-sectional shape of light emitted from the recessed and protruding structure unit 21 is not rotated and remains the same.

Figure 17A:
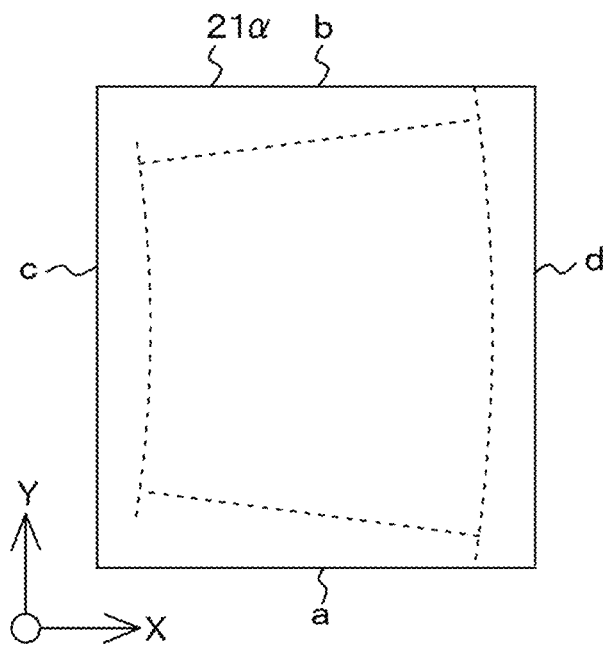
FIG. 17A is a conceptual drawing of the reference example of the recessed and protruding structure unit having a rectangular planar shape.
Figure 17B:
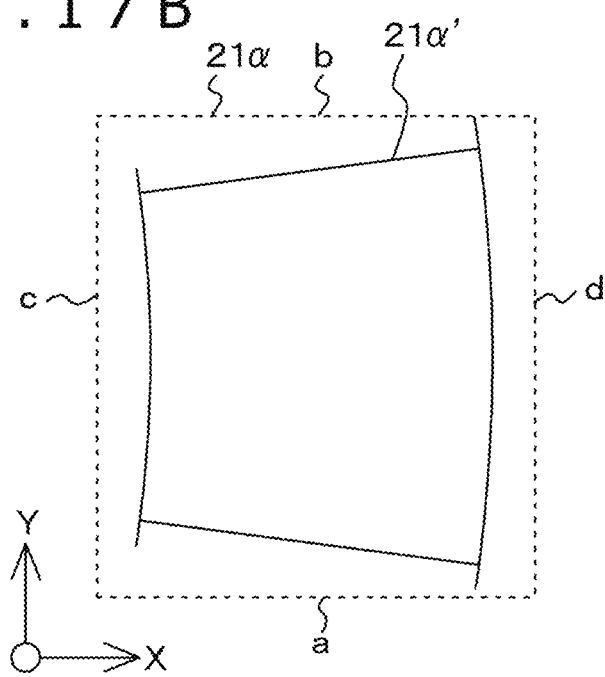
FIG. 17B is a conceptual drawing of a reference example of a fan-surface-like recessed and protruding structure unit obtained from the reference example of the recessed and protruding structure unit having the rectangular planar shape.
Figure 19A:
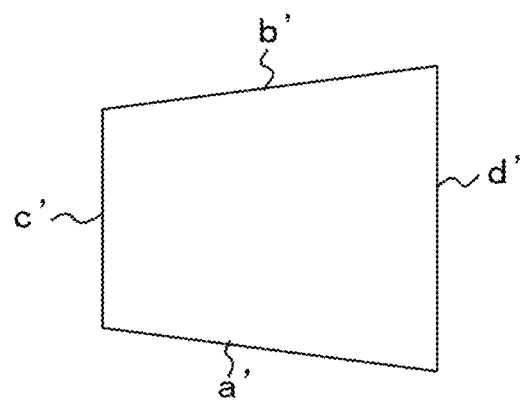
FIG. 19A is a schematic diagram depicting a light emission angle distribution of light having passed through the fan-surface-like recessed and protruding structure unit depicted in FIG. 17B.

Incidentally, the planar shape of a recessed and protruding structure unit 21α in which the recessed and protruding portion has a depth distribution obtained by the GS method is assumed to like, for example, as depicted in FIG. 17A, a rectangle with two opposite sides a and b extending in the X direction and two other opposite sides c and d extending in the Y direction. It is assumed that 24 fan-surface-like recessed and protruding structure units 21α' are obtained by taking out the fan-surface-like recessed and protruding structure unit 21α' from the recessed and protruding structure unit 21α as described above with the recessed and protruding portions unchanged as depicted in FIG. 17B and that the 24 fan-surface-like recessed and protruding structure units 21α' are then placed in the outer circumferential portion of the disc-like substrate 22 as depicted in FIG. 6A. In this case, the cross-sectional shape of light emitted from the recessed and protruding structure unit 21α' in the rotating state is not like a rectangle but is like an isosceles trapezoid including a bottom side c' (side closer to the rotation axis AR) shorter than a top side d' as depicted in FIG. 19A.

Figure 18A:
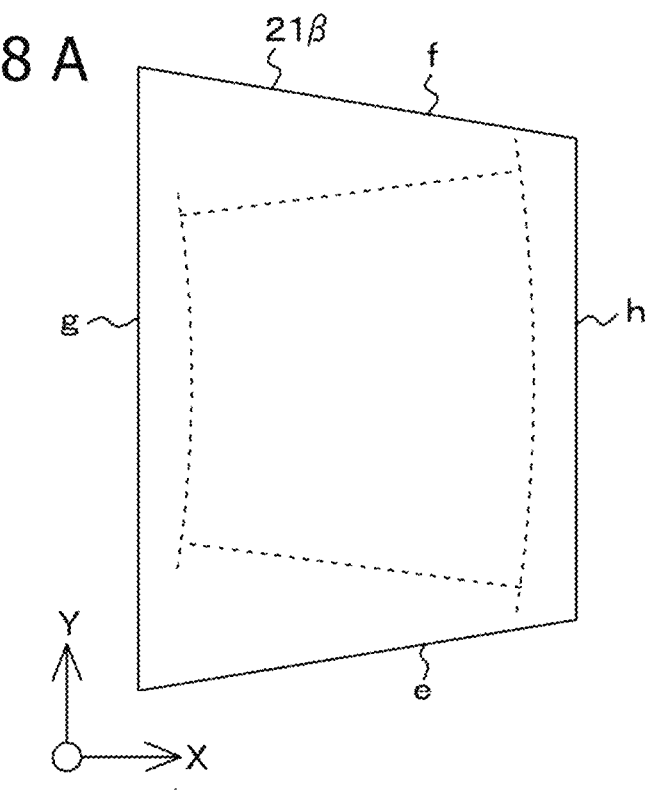
FIG. 18A is a conceptual drawing of a recessed and protruding structure unit corresponding to the recessed and protruding structure unit of Example 1 having an isosceles-trapezoidal planar shape.
Figure 18B:
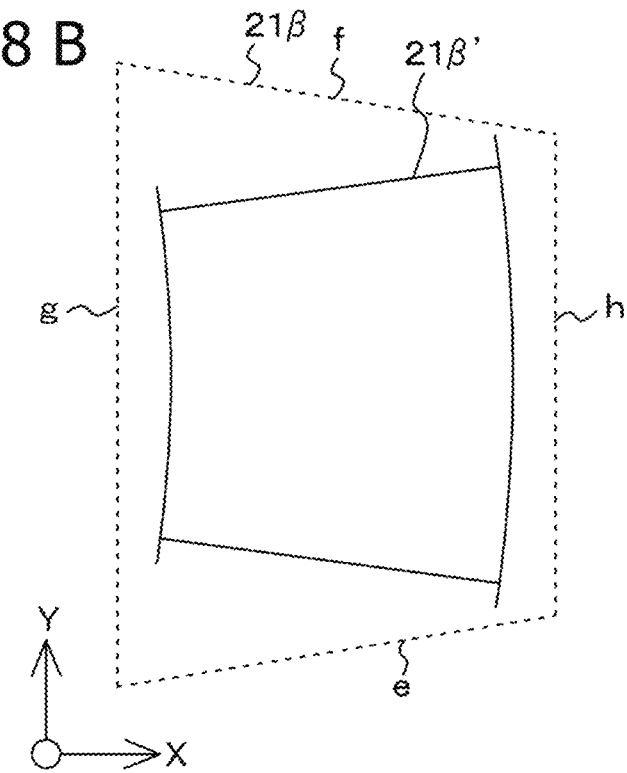
FIG. 18B is a conceptual drawing of the recessed and protruding structure unit of Example 1 and having a fan surface shape, the recessed and protruding structure unit being obtained from the recessed and protruding structure unit depicted in FIG. 18A and having the isosceles-trapezoidal planar shape.
Figure 19B:
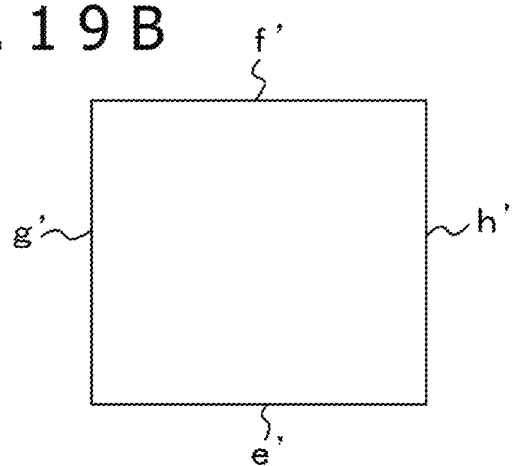
FIG. 19B is a schematic diagram depicting a light emission angle distribution of light having passed through the fan-surface-like recessed and protruding structure unit of Example 1 depicted in FIG. 18B.

To solve such a problem, the planar shape of the recessed and protruding structure unit 21β in which the recessed and protruding portion 21' has a depth distribution obtained by the GS method is assumed to be like, for example, as depicted in FIG. 18A, an isosceles trapezoid including two opposite sides e and f extending substantially in the X direction and two other opposite sides g and h extending in the Y direction. Then, such an isosceles trapezoid is deformed into a fan surface shape, and at this time, as depicted in FIG. 18B, the formation state of the recessed and protruding portion 21' is more heavily compressed at a position closer to the rotation axis AR along the Y axis or parallel to the Y axis. In some cases, the formation state of the recessed and protruding portion 21' is more significantly elongated at a position farther from the rotation axis AR along the Y axis or parallel to the Y axis. Specifically, to externally shape light emitted from the recessed and protruding structure unit 21 in the rotating state like a rectangle, in other words, to form the cross-sectional shape of light emitted from the recessed and protruding structure unit 21 like a rectangle, the recessed and protruding portion 21' in a recessed and protruding structure unit 21β' is only required to be designed in such a manner as to execute the above-described compression processing (optionally the elongation processing) such that the cross-sectional shape of light emitted from the recessed and protruding structure unit 21β in a non-rotating state is like an isosceles trapezoid. In other words, light emitted from the recessed and protruding structure unit 21β in the non-rotating state is only required to be externally shaped like an isosceles trapezoid including a bottom side g (side closer to the rotation axis) longer than a top side h, the top side h and the bottom side g extending parallel to the Y axis. The relation between the value $A_1$ of (length of the bottom side g)/(length of the top side h) and the value $A_2$ of (outer diameter)/(inner diameter) of the fan-surface-like recessed and protruding structure unit 21 preferably satisfies, for example, $0.85 \le A_1/A_2 \le 1.15$. In Example 1, $A_1/A_2=1.0$ is set. Thus, as depicted in FIG. 19B, the cross-sectional shape of light emitted from the recessed and protruding structure unit 21 in the rotating state is like a rectangle with two sides e' and f' extending in the X direction and two other opposite sides g' and h' extending in the Y direction.

Figure 20:
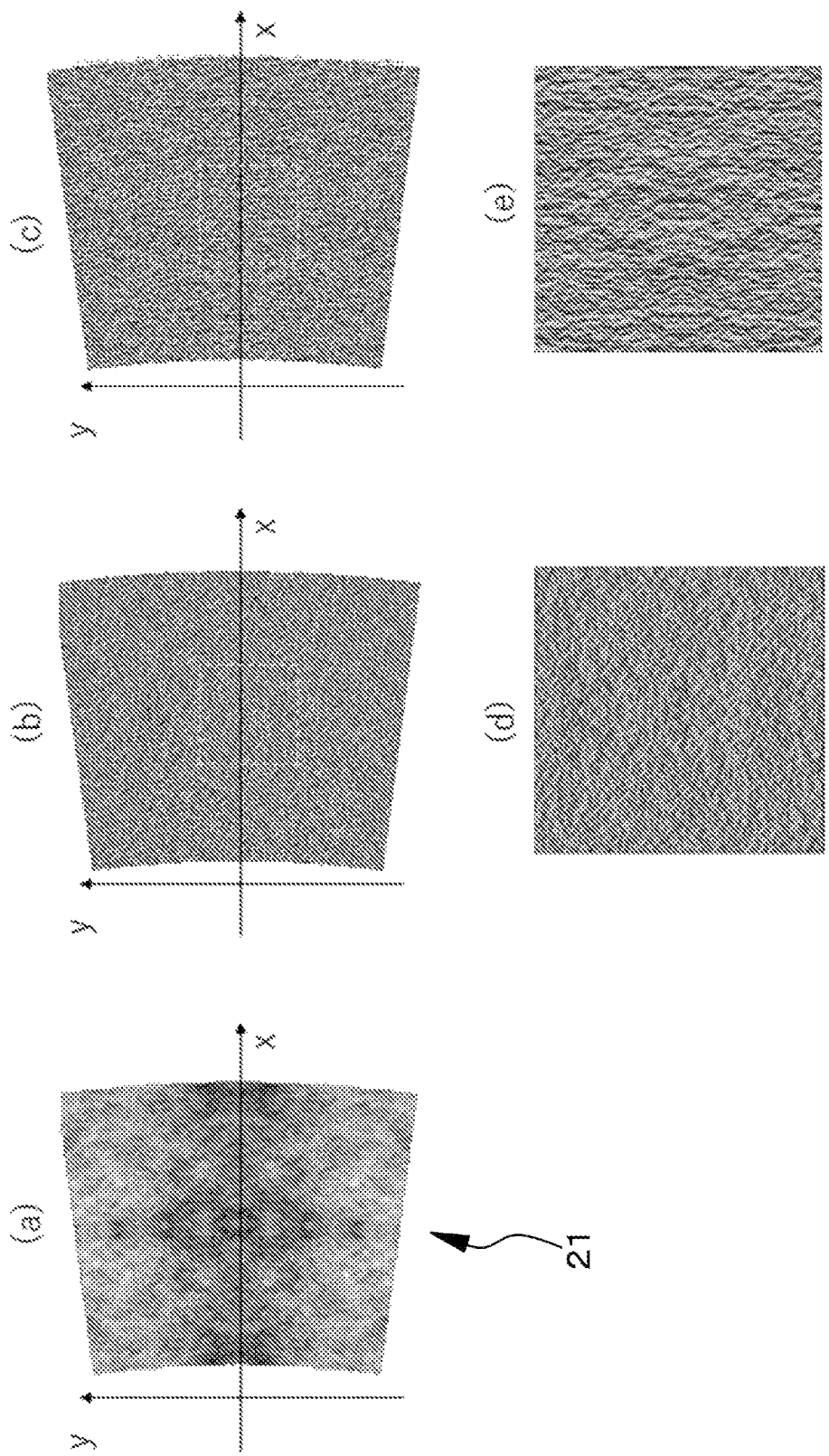
FIG. 20 (a) of FIG. 20 is a plan view of one fan-surface-like recessed and protruding structure unit in Example 1, (b) and (c) of FIG. 20 are diagrams depicting $\partial Z/\partial X = [\partial f(X, Y)/\partial X]_Y$ and $\partial Z/\partial Y = [\partial f(X, Y)/\partial Y]_X$, and (d) of FIG. 20 and (e) of FIG. 20 are diagrams depicting $\partial Z/\partial X$ and $\partial Z/\partial Y$ and respectively obtained by extracting parts of (b) of FIG. 20 and (c) of FIG. 20 in the shape of a rectangle.
Figure 21:
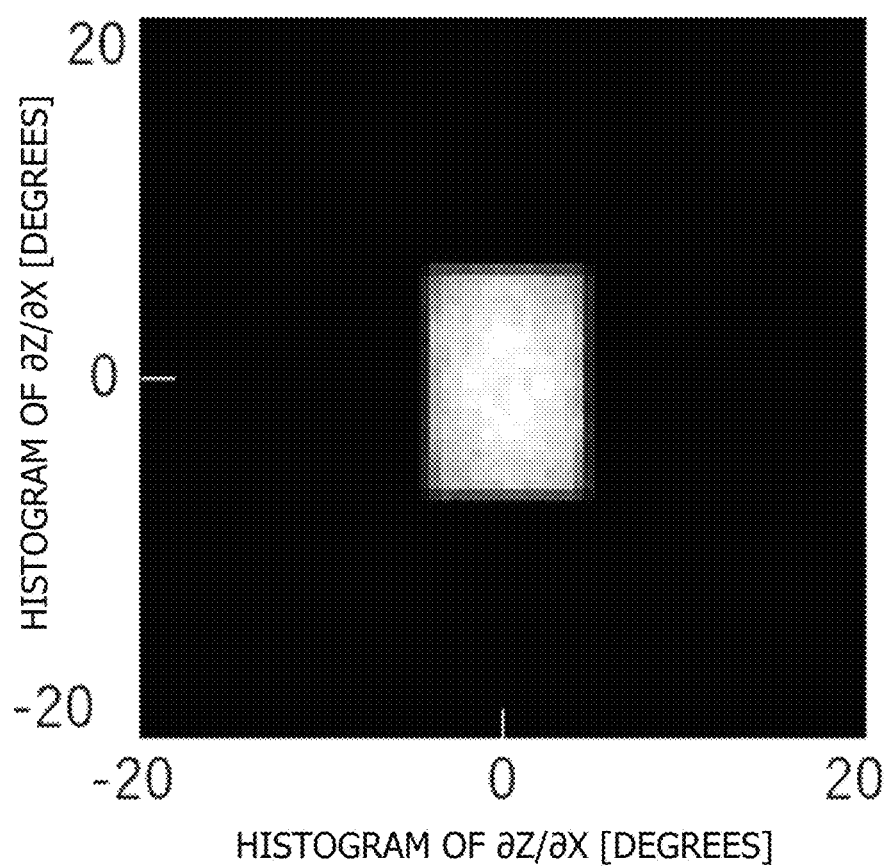
FIG. 21 is a diagram depicting a histogram distribution obtained by converting $\partial Z/\partial X$ and $\partial Z/\partial Y$ depicted in (d) of FIG. 20 and (e) of FIG. 20.

(a) of FIG. 20 depicts a plan view of the structure of one fan-surface-like recessed and protruding structure unit 21. In addition, (b) of FIG. 20 and (c) of FIG. 20 depict $\partial Z/\partial X=[\partial f(X, Y)/\partial X]_Y$ and $\partial Z/\partial Y=[\partial f(X, Y)/\partial Y]_X$. The area of the recessed and protruding structure unit 21 on which light is incident is shaped like a circle with a diameter of 1.5 mm, and (d) and (e) of FIG. 20 each depict a part of the area which is extracted in the form of a rectangle depicted by dotted lines, the part corresponding to each of $\partial Z/\partial X$ and $\partial Z/\partial Y$. Furthermore, FIG. 21 depicts a histogram distribution obtained by converting $\partial Z/\partial X$ and $\partial Z/\partial Y$ depicted in (d) and (e) of FIG. 20 into histograms. As seen in FIG. 21, the recessed and protruding structure unit 21 involves a rectangular gradient distribution (rectangular distribution of $\partial Z/\partial X$ and $\partial Z/\partial Y$). Consequently, on the basis of the Snell's law, the light emission angle distribution is as depicted in FIG. 10A. In other words, FIG. 10A is approximately $1/1.5$ times $(=1/n_d)$ of FIG. 21. Thus, the optical member 20 and the recessed and protruding structure unit 21 are designed in accordance with the GS method, but actually exhibit a refraction effect.

Figure 22A:
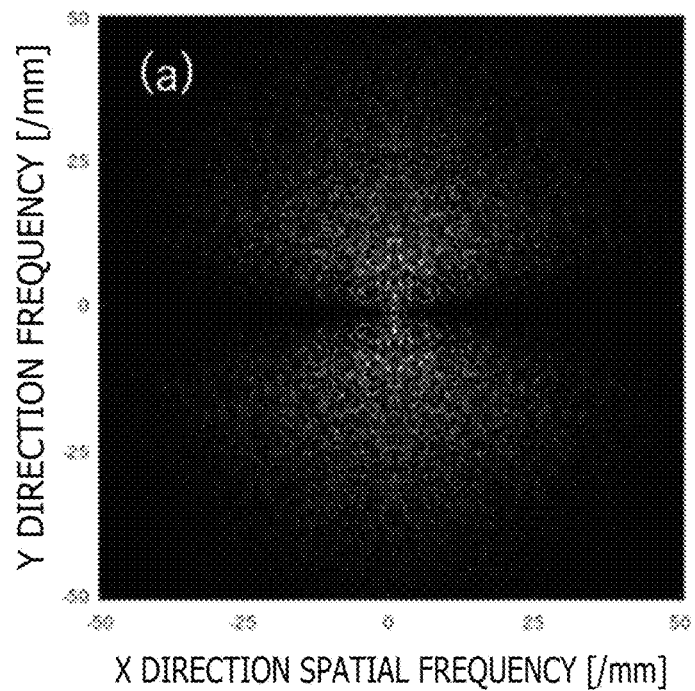
FIG. 22A and FIG. 22B are diagrams depicting results of determination of a spatial frequency by Fourier transform on the basis of the value of $\partial Z/\partial X$ and the value of $\partial Z/\partial Y$ in (d) and (e) of FIG. 20.
Figure 22B:
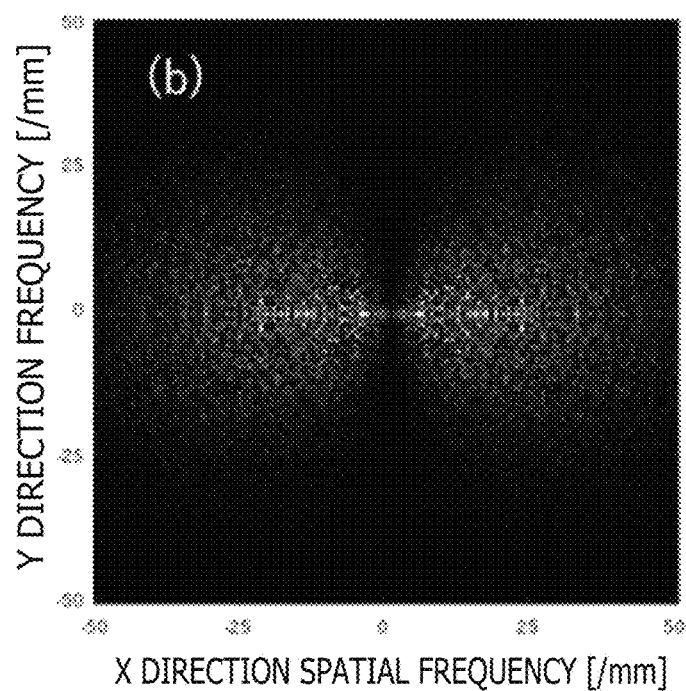

FIG. 22A depicts the result of determination of a spatial frequency using the Fourier conversion method on the basis of the value of $\partial Z/\partial X$ in (d) of FIG. 20, and FIG. 22B depicts the result of determination of a spatial frequency using the Fourier conversion method on the basis of the value of $\partial Z/\partial X$ in (e) of FIG. 20. Note that the horizontal axis in FIGS. 22A and 22B indicates the value of $\partial Z/\partial X$ and the value of $\partial Z/\partial Y$ in the X axis direction and that the vertical axis in FIGS. 22A and 22B indicates the value of $\partial Z/\partial X$ and the value of $\partial Z/\partial Y$ in the Y axis direction. Typical diffusion plates are isotropic, and thus distributions corresponding to FIGS. 22A and 22B are point-symmetric in the vertical direction (Y axis direction) and in the horizontal direction (X axis direction). On the other hand, for the recessed and protruding structure unit 21, the distributions are point-asymmetric in the vertical direction (Y axis direction) and in the horizontal direction (X axis direction). In other words, $\partial Z/\partial X$ and $\partial Z/\partial Y$ that are angular distributions of the recessed and protruding portion 21' are point-asymmetric when the intersection between the X axis and the Y axis is a point of symmetry. Additionally, calculation results for the average spatial frequency are as indicated in Table 2 below. The average value of the average spatial frequency is obtained by multiplying each spatial frequency (absolute value) by the distributions in FIGS. 22A and 22B. Table 2 below also indicates $N_X=L_{X\text{-}0} \times F_{X\text{-}ave}$ and $N_Y=L_{Y\text{-}0} \times F_{Y\text{-}ave}$ when $F_{X\text{-}ave}$ is the average value of the spatial frequency of the recessed and protruding portion 21' along the X axis, $F_{Y\text{-}ave}$ is the average value of the spatial frequency of the recessed and protruding portion 21' along the Y axis, $L_{X\text{-}0}$ is the length along the X axis of the recessed and protruding structure unit 21 on which light from the light source 10 is incident, and $L_{Y\text{-}0}$ is the length, along the Y axis, of the recessed and protruding structure unit 21 on which light from the light source 10 is incident. However, $L_{X\text{-}0}=L_{Y\text{-}0}=1.5$ mm is set.

Here, in FIG. 21, the horizontal axis indicates a histogram distribution obtained by converting, into a histogram, $\partial Z/\partial X$ at a position corresponding to the emission angle, in the X axis direction, of light emitted from the center of the recessed and protruding structure unit 21, and the vertical axis indicates a histogram distribution obtained by converting, into a histogram, $\partial Z/\partial Y$ at a position corresponding to the emission angle, in the Y axis direction, of light emitted from the center of the recessed and protruding structure unit 21.

<Table 2>

Average value $F_{X\text{-}ave}$ of the spatial frequency based on the value of $\partial Z/\partial X$: 13.3 mm$^{-1}$ Average value $F_{Y\text{-}ave}$ of the spatial frequency based on the value of $\partial Z/\partial Y$: 17.1 mm$^{-1}$ $$N_X = L_{X\text{-}0} \times F_{X\text{-}ave}: 19.9$$

$$N_Y = L_{Y\text{-}0} \times F_{Y\text{-}ave}: 25.6$$

Here, $N_X$ and $N_Y$ mean how many increases and decreases in $\partial Z/\partial X$ and $\partial Z/\partial T$ are present within the light irradiation range on average. In other words, $N_X$ and $N_Y$ indicate the average number of recesses and protrusions present. $N_X$ and $N_Y$ having extremely low values lead to reduced (insufficient) overlap between light emission angle distributions caused by refraction, preventing the desired light emission angle distribution from being maintained. Thus, the following are desirably satisfied:

$$N_X = L_{X\text{-}0} \times F_{X\text{-}ave} \geq 10 \text{ and}$$

$$N_Y = L_{Y\text{-}0} \times F_{Y\text{-}ave} \geq 10.$$

For a more desirable light emission angle distribution, preferably the following are desirably satisfied.

$$N_X = L_{X\text{-}0} \times F_{X\text{-}ave} \geq 15 \text{ and}$$

$$N_Y = L_{Y\text{-}0} \times F_{Y\text{-}ave} \geq 15.$$

Additionally, an excessively large average value of the spatial frequency leads to an intense diffraction effect and also degrades productivity. Accordingly, desirably, $F_{X\text{-}ave}$ is equal to or less than $1 \times 10^3$ mm$^{-1}$, preferably equal to or less than $1 \times 10^2$ mm$^{-1}$, and $F_{Y\text{-}ave}$ is equal to or less than $1 \times 10^3$ mm$^{-1}$, preferably equal to or less than $1 \times 10^2$ mm$^{-1}$. Note that, for example, $F_{X\text{-}ave}$ being $1 \times 10^3$ mm$^{-1}$ means that the length of one period of the recessed and protruding portion 21' along the X axis is 1 μm and that $F_{X\text{-}ave}$ being $1 \times 10^2$ mm$^{-1}$ means that the length of one period of the recessed and protruding portion 21' along the X axis is 10 μm. Furthermore, $F_{X\text{-}ave} \neq F_{Y\text{-}ave}$.

Figure 23:
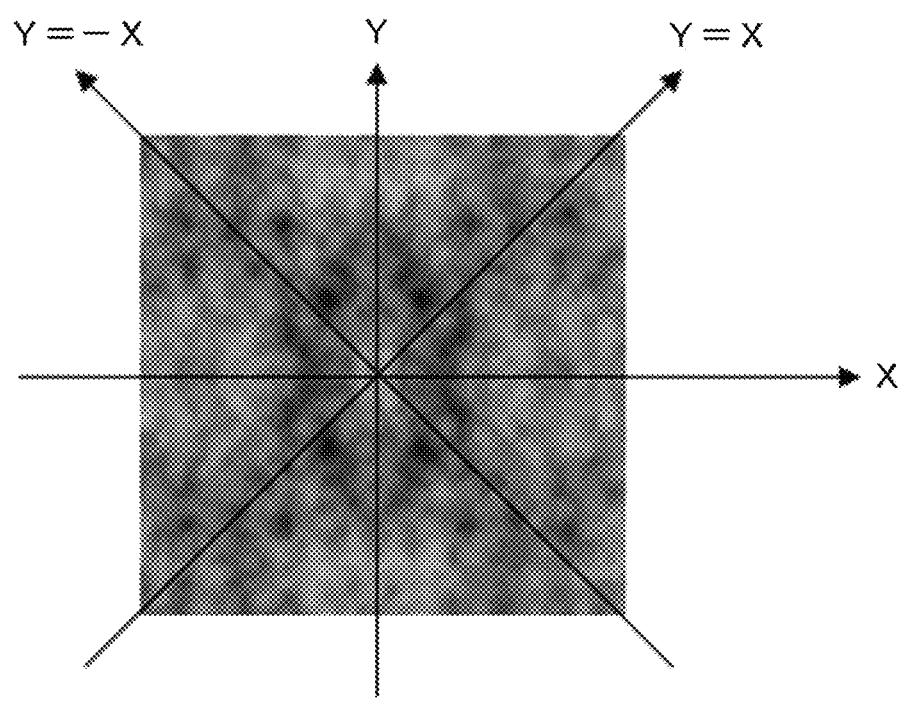
FIG. 23 is a diagram depicting the average value $F_{X'-ave}$ of the spatial frequency of the recessed and protruding portion along a straight line satisfying Y=X.

Additionally, as illustrated in FIG. 23, when $F_{X'\text{-}ave}$ is the average value of the spatial frequency of the recessed and protruding portion 21' along a straight line satisfying $Y=X$, and $F_{Y'\text{-}ave}$ is the average value of the spatial frequency of the recessed and protruding portion 21' along a straight line satisfying $Y=-X$, the distribution is more approximate to a rectangle in diagonal directions, and thus $$F_{X'\text{-}ave} > F_{X\text{-}ave}$$

$$F_{X'\text{-}ave} > F_{Y\text{-}ave}$$

$$F_{Y'\text{-}ave} > F_{X\text{-}ave}$$

and $F_{Y'\text{-}ave} > F_{Y\text{-}ave}$ are satisfied. Specifically, Table 3 below indicates the values of $F_{X'\text{-}ave}$, $F_{Y'\text{-}ave}$, $N_X' = L_{X\text{-}0} \times F_{X'\text{-}ave}$, and $N_Y' = L_{Y\text{-}0} \times F_{Y'\text{-}ave}$.

<Table 3>

$$F_{X'\text{-}ave}: 23.7 \text{ mm}^{-1}$$

$$F_{Y'\text{-}ave}: 23.7 \text{ mm}^{-1}$$

$N_{X'} = L_{X-0} \times F_{X'-ave} = 35.6$ $N_{Y'} = L_{Y-0} \times F_{Y'-ave} = 35.6$ Furthermore, Table 4 indicates the results of calculation of kurtosis β of ∂Z/∂X and ∂Z/∂Y within the light irradiation range. The kurtosis is defined as the ratio $\mu_4/\sigma^4$ of the fourth moment $\mu_4$ around the average value and the fourth power of a standard deviation σ, and the distribution becomes more round with decreasing kurtosis. It is known that kurtosis=0 indicates a normal distribution and that kurtosis is −1.2 in a uniform distribution. In the recessed and protruding structure unit 21 constituting the illumination apparatus of Example 1, the value of ∂Z/∂X and the value of ∂Z/∂Y are preferably closer to the uniform distribution than to the Gaussian distribution, and specifically, desirably β (kurtosis along the X axis $β_X$ and kurtosis along the Y axis $β_Y$)≤−0.5, preferably β (kurtosis along the X axis $β_X$ and kurtosis along the Y axis $β_Y$)≤−0.8.

<Table 4>

Kurtosis of ∂Z/∂X$β_X$: −1.1

Kurtosis of ∂Z/∂Y$β_Y$: −1.1

A configuration of a projective display apparatus (projector) will be described with reference to FIG. 4. FIG. 4 is a schematic diagram illustrating a general configuration of a projective display apparatus 100 including an illumination apparatus (light source apparatus) 110. Note that, by way of example, a projective display apparatus based on a 3LCD reflective 3LCD technology will be described that modulates light using a reflective liquid crystal panel (LCD). The illumination apparatus 110 can include the illumination apparatus described in Examples 1 to 3.

The projective display apparatus 100 includes the illumination apparatus 110 including a fly eye lens 121 (121A and 121B) [integrator 30], an illumination optical system 120, an image forming unit 130, and a projective optical system 140 in this order.

The illumination optical system 120 includes, for example, a polarization conversion element 122, a lens 123, dichroic mirrors 124A and 124B, reflection mirrors 125A and 125B, lenses 126A and 126B, a dichroic mirror 127, and polarizing plates 128A, 128B, and 128C in order of increasing distance from the illumination apparatus 110.

The fly eye lens 121 (121A and 121B) is intended to homogenize the illuminance distribution of white light from the illumination apparatus 110 (specifically, the optical member 20). The polarization conversion element 122 functions to align a polarizing axis of incident light with a predetermined direction, and for example, converts light other than p polarized light into the p polarized light. The lens 123 condenses light from the polarization conversion element 122 toward the dichroic mirrors 124A and 124B. The dichroic mirrors 124A and 124B selectively reflect light in a predetermined wavelength region, while selectively transmitting light in the other wavelength regions. For example, the dichroic mirror 124A mainly reflects red light toward the reflection mirror 125A. Additionally, the dichroic mirror 124B mainly reflects blue light toward the reflection mirror 125B. Consequently, green light is mainly transmitted through both dichroic mirrors 124A and 124B toward a reflective polarizing plate 131C of the image forming unit 130. The reflection mirror 125A reflects light (mainly red light) from the dichroic mirror 124A toward the lens 126A, and the reflection mirror 125B reflects light (mainly blue light) from the dichroic mirror 124B toward the lens 126B. The lens 126A transmits light (mainly red light) from the reflection mirror 125A and condenses the light onto the dichroic mirror 127. The lens 126B transmits light (mainly blue light) from the reflection mirror 125B and condenses the light onto the polarizing plate 128B. The dichroic mirror 127 selectively reflects green light, while selectively transmitting light in the other wavelength regions. Here, red light components of the light from the transmission lens 126A are transmitted. In a case where the light from the transmission lens 126A includes green light components, the dichroic mirror 127 reflects the green light components toward the polarizing plate 128C. The polarizing plates 128A, 128B, and 128C each include a polarizer with a polarizing axis in a predetermined direction. For example, in a case where the polarization conversion element 122 has performed conversion into p polarized light, the polarizing plates 128A, 128B, and 128C transmits the p polarized light, while reflecting s polarized light.

The image forming unit 130 includes reflective polarizing plates 131A, 131B, and 131C, reflective liquid crystal panels 132A, 132B, and 132C, and a dichroic prism 133.

The reflective polarizing plates 131A, 131B, and 131C transmit light (for example, p polarized light) with the same polarizing axis as that of polarized light from a respective one of the polarizing plates 128A, 128B, and 128C, while reflecting light with the other polarizing axes (s polarized light). Specifically, the reflective polarizing plate 131A transmits red light of p polarized light from the polarizing plate 128A toward the reflective liquid crystal panel 132A. The reflective polarizing plate 131B transmits blue light of p polarized light from the polarizing plate 128B toward the reflective liquid crystal panel 132B. The reflective polarizing plate 131C transmits green light of p polarized light from the polarizing plate 128C toward the reflective liquid crystal panel 132C. Additionally, green light of p polarized light entering the reflective polarizing plate 131C after passing through both the dichroic mirrors 124A and 124B is directly transmitted through the reflective polarizing plate 131C and enters the dichroic prism 133. Furthermore, the reflective polarizing plate 131A reflects red light of s polarized light from the reflective liquid crystal panel 132A, and the reflected light enters the dichroic prism 133. The reflective polarizing plate 131B reflects blue light of s polarized light from the reflective liquid crystal panel 132B, and the reflected light enters the dichroic prism 133. The reflective polarizing plate 131C reflects green light of s polarized light from the reflective liquid crystal panel 132C, and the reflected light enters the dichroic prism 133.

The reflective liquid crystal panels 132A, 132B, and 132C respectively spatially modulate red light, blue light, and green light.

The dichroic prism 133 synthesizes incident red light, blue light, and green light, and emits the resultant light toward the projective optical system 140. The projective optical system 140 includes lenses 142 to 146 and a mirror 141. The projective optical system 140 enlarges light emitted from the image forming unit 130 and projects the resultant light on a screen (not depicted) or the like.

FIG. 5 depicts a schematic diagram of a projective display apparatus (projector) with another configuration. The projective display apparatus is a projective display apparatus based on a transmissive 3LCD technology and which modulates light using a transmissive liquid crystal panel (LCD).

The projective display apparatus (projector) 200 includes the illumination apparatus 110 including an integrator 221, an optical modulation apparatus (including an image forming unit 220 and an illumination optical system) that generates an image using light emitted from the illumination apparatus 110 (specifically, the optical member 20), and a projective optical system 240 that projects image light generated by the image forming unit 220.

The image forming unit 220 including the illumination optical system includes a polarization conversion element 222, a condenser lens 223, dichroic mirrors 224 and 225, mirrors 226, 227, and 228, and relay lenses 231 and 232. Additionally, the image forming unit 220 includes a field lens 233 (233R, 233G, and 233B), liquid crystal light valves 234R, 234G, and 234B, and a dichroic prism 235.

The integrator 221 includes a function to generally arrange, into a uniform luminance distribution, incident light from the illumination apparatus 110 (specifically, the optical member 20) with which the liquid crystal light valves 234R, 234G, and 234B are irradiated. For example, the integrator 221 includes a first fly eye lens 221A including multiple microlenses (not depicted) arrayed in a two-dimensional manner and a second fly eye lens 221B including multiple microlenses arrayed corresponding to the respective microlenses of the first fly eye lens 221A.

Parallel beams incident on the integrator 221 from the illumination apparatus 110 are split into multiple light fluxes by the microlenses of the first fly eye lens 221A, and each of the light fluxes is formed into an image on the corresponding microlens in the second fly eye lens 221B. Each of the microlenses of the second fly eye lens 221B functions as a secondary light source to irradiate the polarization conversion element 222 with multiple parallel beams as incident light.

The polarization conversion element 222 includes a function to uniformize the polarization state of incident light incident via the integrator 221 and the like. The polarization conversion element 222, for example, emits emitted light including blue light B3, green light G3, and red light R3, via the condenser lens 223 positioned on the emission side of the illumination apparatus 110.

The dichroic mirrors 224 and 225 have the property of selectively reflecting light in a predetermined wavelength region, while transmitting light in the other wavelength regions. For example, the dichroic mirror 224 selectively reflects the red light R3. In the green light G3 and blue light B3 transmitted through the dichroic mirror 224, the dichroic mirror 225 selectively reflects the green light G3. The remaining blue light B3 is transmitted through the dichroic mirror 225. Thus, light emitted from the illumination apparatus 110 is separated into multiple light beams of different colors.

The red light R3 resulting from the separation is reflected by the mirror 226 and collimated by passing through the field lens 233R, and then enters the liquid crystal light valve 234R for modulation of red light. The green light G3 is collimated by passing through the field lens 233G, and then enters the liquid crystal light valve 234G for modulation of green light. The blue light B3 passes through the relay lens and is reflected by the mirror 227, and passes through the relay lens 232 and is reflected by the mirror 228. The blue light B3 reflected by the mirror 228 passes through the field lens 233B and is collimated by passing through the field lens 233B, and the light then enters the liquid crystal light valve 234B for modulation of blue light.

The liquid crystal light valves 234R, 234G, and 234B are electrically connected to a signal source (for example, a personal computer or the like) that supplies image signals including image information. On the basis of supplied image signals in the respective colors, the liquid crystal light valves 234R, 234G, and 234B modulate incident light for each pixel to respectively generate a red image, a green image, and a blue image. The modulated light beams in the respective colors (images formed) are incident on the dichroic prism 235 for synthesis. The dichroic prism 235 overlaps light beams in the respective colors incident from three directions for synthesis, and the resultant light is emitted toward the projective optical system 240.

The projective optical system 240 includes multiple lenses 241 and the like and irradiates the screen (not depicted) with light resulting from the synthesis performed by the dichroic prism 235. Thus, a full-color image is displayed.

As described above, (A) The optical member is rotatable around a rotation axis extending parallel to the direction in which light from the light source is incident and is emitted, (B) The planar shape of the optical member is annular around the rotation axis, and (C) The first surface or the second surface of the optical member is provided with multiple recessed and protruding structure units consecutively formed and each having a fan-surface-like planar shape and including a recessed and protruding portion.

Accordingly, even in a case where the optical member is rotated, light emitted from the rotating recessed and protruding portion can maintain a desired cross-sectional shape, for example, a rectangle approximate to the external shape of the integrator. Furthermore, (D) An extension of the boundary between adjacent recessed and protruding structure units intersects the rotation axis, (E) When the boundary between the adjacent recessed and protruding structure units is a mirror plane, the adjacent recessed and protruding structure units are in a mirror symmetry relation, and the recessed and protruding portions of the adjacent recessed and protruding structure units are smoothly connected together, and (F) The recesses and protrusions in the recessed and protruding portion of each recessed and protruding structure unit are smoothly connected together.

Accordingly, even in a case where the optical member is rotated, light emitted from the rotating recessed and protruding portion can constantly and reliably maintain a desired cross-sectional shape, for example, a rectangle approximate to the external shape of the integrator. In addition, (G) The area occupied by the recessed and protruding portion of each recessed and protruding structure unit is larger in size than light incident from the light source.

This allows prevention of the problem of unwanted diffracted light resulting from a light diffraction effect. Note that, unlike a lens array, the recessed and protruding structure unit includes no repeated structures smaller than the light irradiation area. The lens array can provide a similar light emission angle distribution, but an actual combination with very coherent light such as laser light leads to high-order diffracted light depending on repetition periodicity. The recessed and protruding structure unit is relatively highly random and generates no diffracted light. Additionally, rotation of the optical member enables speckle noise to be reduced. Furthermore, light emitted from the optical member can be provided with a desired cross-sectional shape.

Additionally, a recessed and protruding structure unit can be designed that includes a recessed and protruding shape with a flexible refraction angle, thus allowing, for example, possible distortion in the condenser lens to be corrected. Accordingly, a light position distribution more uniform than a known light position distribution (≈light emission angle distribution) can be formed on the integrator. Additionally, there is a problem in that, in a case where few semiconductor laser elements constitute the light source, the use of a diffusion plate leads to difficult light distribution control on the integrator. However, appropriate design of the recessed and protruding structure unit allows the light position distribution (≈light emission angle distribution) on the integrator to be uniformized. This enables color unevenness and speckle noise to be reduced with no decrease in the quantity of light. Furthermore, auxiliary arrangement of a cylindrical lens in addition to the collimator lens enables a light position distribution (≈light emission angle distribution) similar to a circle to be formed on the integrator.

Incidentally, depolarization may occur depending on the type of the diffusion plate. The use of an element with polarization dependence [for example, LCOS (Liquid Crystal on Silicon), an LCD (Liquid Crystal Display) or the like] requires a polarization rectifier element. On the other hand, the optical element in Examples 1 to 3 spreads light in accordance with the law of reflection, preventing depolarization. This eliminates the need for a polarization rectifier element (for example, a P wave-S wave conversion apparatus, a P-S converter, or the like), allowing the whole system to be compactified. The polarization rectifier element also degrades efficiency. However, Examples 1 to 3 eliminate the need for the polarization rectifier element, leading to high light utilization efficiency.

EXAMPLE 2

Figure 2:
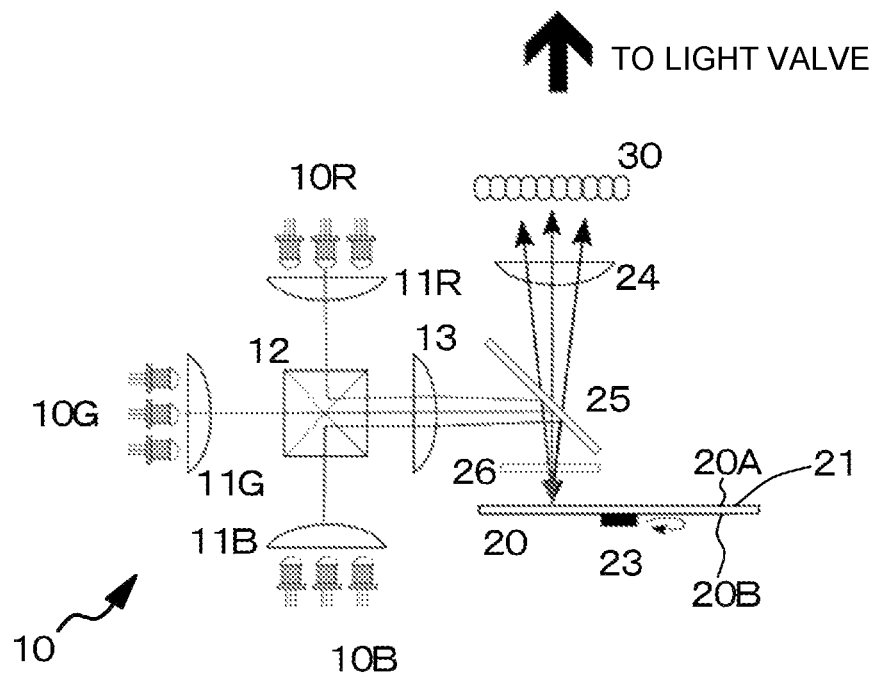
FIG. 2 is a conceptual drawing of an illumination apparatus of Example 2.

Example 2 is a variation of Example 1. In an illumination apparatus in Example 2 depicted in FIG. 2, light from the light source 10 is incident on each recessed and protruding structure unit 21 in the rotating state from the first surface 20A of each recessed and protruding structure unit 21 and is emitted from the first surface 20A of each recessed and protruding structure unit 21 toward the integrator 30, the first surface 20A of each recessed and protruding structure unit 21 is provided with the recessed and protruding portion 21', and the second surface 20B of each recessed and protruding structure unit 21 is flat and constitutes a light reflection surface. Specifically, the second surface 20B is provided with a light reflection layer including, for example, silver (Ag), aluminum (Al), or the like.

The illumination apparatus further includes a polarization beam splitter 25 and a quarter wavelength plate 26, and light from the light source 10 enters the polarization beam splitter 25 and exits the polarization beam splitter 25 along the first direction (reflected by the polarization beam splitter 25 in the illustrated example), passes through the quarter wavelength plate 26, is reflected at the recessed and protruding structure unit 21, passes through the quarter wavelength plate 26, enters the polarization beam splitter 25, exits the polarization beam splitter 25 along the second direction different from the first direction (passing through the polarization beam splitter 25 in the illustrated example), and enters the integrator 30.

Example 1 includes a transmissive recessed and protruding structure unit, whereas Example 2 includes a reflective recessed and protruding structure unit. In a case of the transmissive recessed and protruding structure unit, the emission angle of light from the recessed and protruding structure unit can be expressed as:

(emission angle of light from recessed and protruding structure unit)≈(incident angle of light on recessed and protruding structure unit)/(refractive index $n_d$)

On the other hand, in a case of the reflective recessed and protruding structure unit, in the recessed and protruding structure unit, light is subjected to two refraction actions, and thus the emission angle of light from the recessed and protruding structure unit is approximately twice the incident angle of light on the recessed and protruding structure unit. Consequently, in a case where the recessed and protruding portion 21' in the transmissive recessed and protruding structure unit has a maximum depth of 27 μm, the recessed and protruding portion 21' in the reflective recessed and protruding structure unit is only required to have a maximum depth obtained by multiplying the maximum depth of the recessed and protruding portion 21' in the transmissive recessed and protruding structure unit by $1/(2 \times n_d)$. Specifically, in the reflective recessed and protruding structure unit, the recessed and protruding portion 21' is only required to have a maximum depth of 9 μm. Accordingly, compared to Example 1, Example 2 further facilitates manufacture of the recessed and protruding structure unit.

EXAMPLE 3

Example 3 is a variation of Examples 1 and 2. In Examples 1 and 2, once light from the light source 10 is condensed into the recessed and protruding structure unit 21, the desired light position distribution (≈light emission angle distribution) is formed on the integrator 30 via the condenser lens 24. On the other hand, a sufficient distance between the optical member 20 and the integrator 30 allows the desired light position distribution (≈light emission angle distribution) to be formed on the integrator 30 with no light from the light source 10 condensed into the recessed and protruding structure unit 21. FIG. 3 depicts such a configuration. In Example 3, substantially parallel light beams are incident on the condenser lens 27. The recessed and protruding structure unit 21 is disposed upstream of (on the light source side of) the condenser lens 27. No lens system 13 is provided. The focal length f of the condenser lens 27 satisfies the following equations. Here, $IH_{LD}$ is the maximum image height from the optical axis of laser light, and $IG_{INT}$ is the maximum image height on the integrator 30. θ (unit: rad) is the maximum incident angle on the integrator 30, and φ (unit: rad) is the maximum emission angle in the recessed and protruding structure unit 21.

$IH_{LD}=f \cdot \theta$ $IH_{Int}=f \cdot \varphi$

The following equation is derived from the above-described two equations.

$\theta=\varphi \cdot IH_{LD}/IH_{INT}$

For example,
when θ=2 degrees,
$IH_{INT}$=10 mm, and
$IH_{LD}$=20 mm,
φ=4 degrees, and
f=143 mm.

are obtained. In Example 3, the integrator 30 is disposed at a position corresponding to the focus of the condenser lens 27, and thus a light position distribution similar to that in Example 1 (see (b) of FIG. 9) can be obtained by locating the integrator 30 approximately 143 mm away from the condenser lens 27. The configuration of the recessed and protruding structure unit 21 in this case is only required to be substantially similar to the configuration in Example 1. However, the maximum emission angle φ in the recessed and protruding structure unit 21 is 4 degrees, and the maximum emission angle in FIG. 10A is approximately 15 degrees, and thus Example 3 needs to be approximately (4/15=0.27) with respect to Example 1.

For this purpose, for example, the depth of the recessed and protruding portion 21' in the recessed and protruding structure unit 21 is only required to be 0.27 times as large as the depth in Example 1. In Example 3, the number of components can be reduced, allowing cost reduction and manufacture simplification to be achieved.

Figure 24:
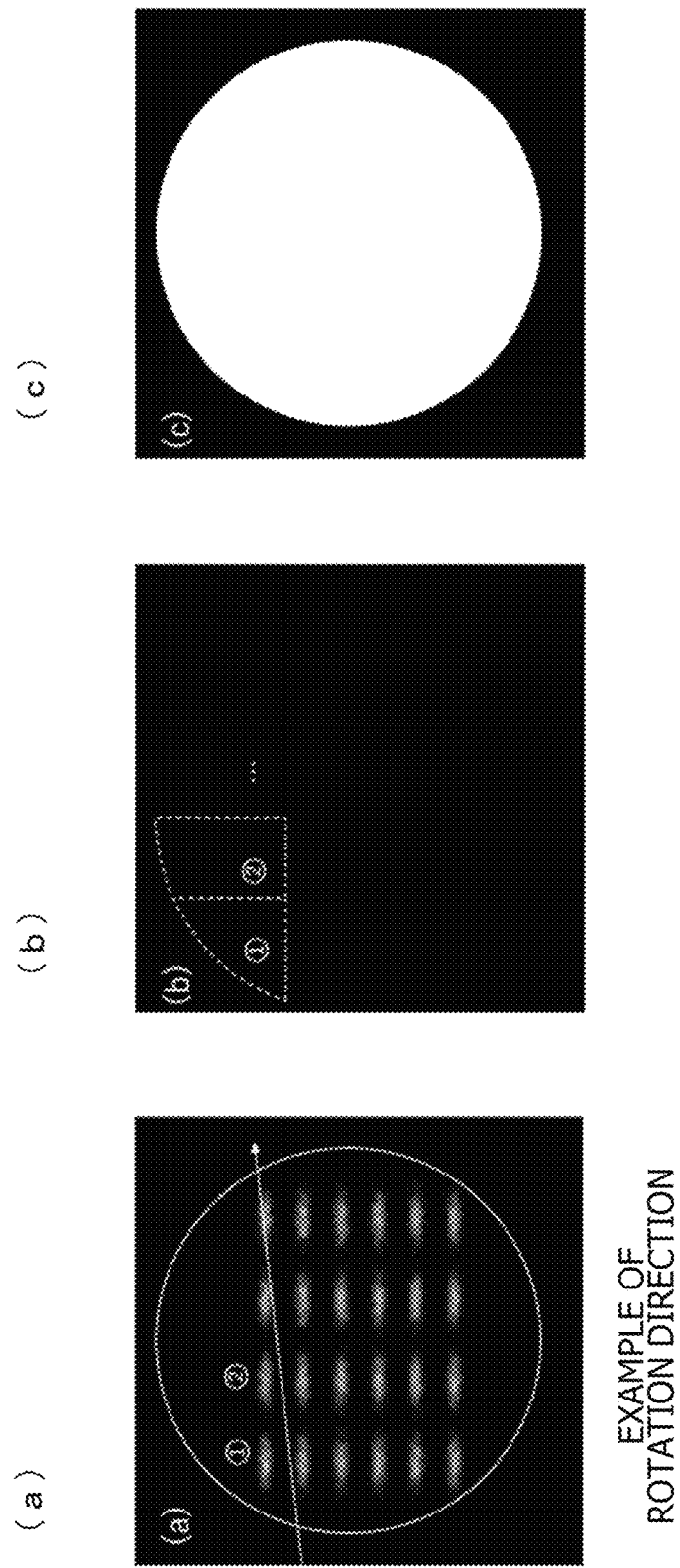
FIG. 24 is a diagram depicting the average value $F_{Y'-ave}$ of the spatial frequency of the recessed and protruding portion along a straight line satisfying Y=-X.

Additionally, in Example 3, the area of the recessed and protruding structure unit 21 where light is incident varies with semiconductor laser element. Accordingly, by controlling, for each semiconductor laser element, the light emission angle in the area of the recessed and protruding structure unit corresponding to each semiconductor laser element, the distribution on the integrator 30 can be further uniformly approximated to the desired shape. For example, on the basis of light from an area of the light source 10 denoted by "1" in (a) of FIG. 24, the recessed and protruding structure unit 21 emits, toward the integrator 30, light with a cross-sectional shape as denoted by "1" in (b) of FIG. 24. Additionally, on the basis of light from an area of the light source 10 denoted by "2" in (a) of FIG. 24, the recessed and protruding structure unit 21 emits, toward the integrator 30, light with a cross-sectional shape as denoted by "2" in (b) of FIG. 24. By thus overlapping light emission angle distributions corresponding to different areas of the light source 10, the light position distribution (≈light emission angle distribution) (see (c) of FIG. 24) on the integrator 30 approximates, for example, a circle. For this purpose, by rotating the optical member 20 (recessed and protruding structure unit 21) in an oblique direction, or the like, the recessed and protruding structure units 21 to be irradiated with light need to be prevented from overlapping in spite of rotation of the optical member 20 (see (a) of FIG. 24). Alternatively, the semiconductor laser element may be inclined with respect to the rotation axis AR.

The optical element, illumination apparatus, and projective display apparatus of the present disclosure have been described above on the basis of the preferred examples. However, the optical element, illumination apparatus, and projective display apparatus of the present disclosure are not intended to be limited to the examples. The light source, the optical system from the light source to the optical member, the optical member, the recessed and protruding structure unit, and the configuration and structure of the optical system from the optical member to the integrator are illustrative and can be appropriately modified. For example, the arrangement of the light emitting elements (semiconductor laser elements) constituting the light source, and the distribution of light emitted from the light source are optional, and the optimal design can be selected depending on the situation.

Figure 26A:
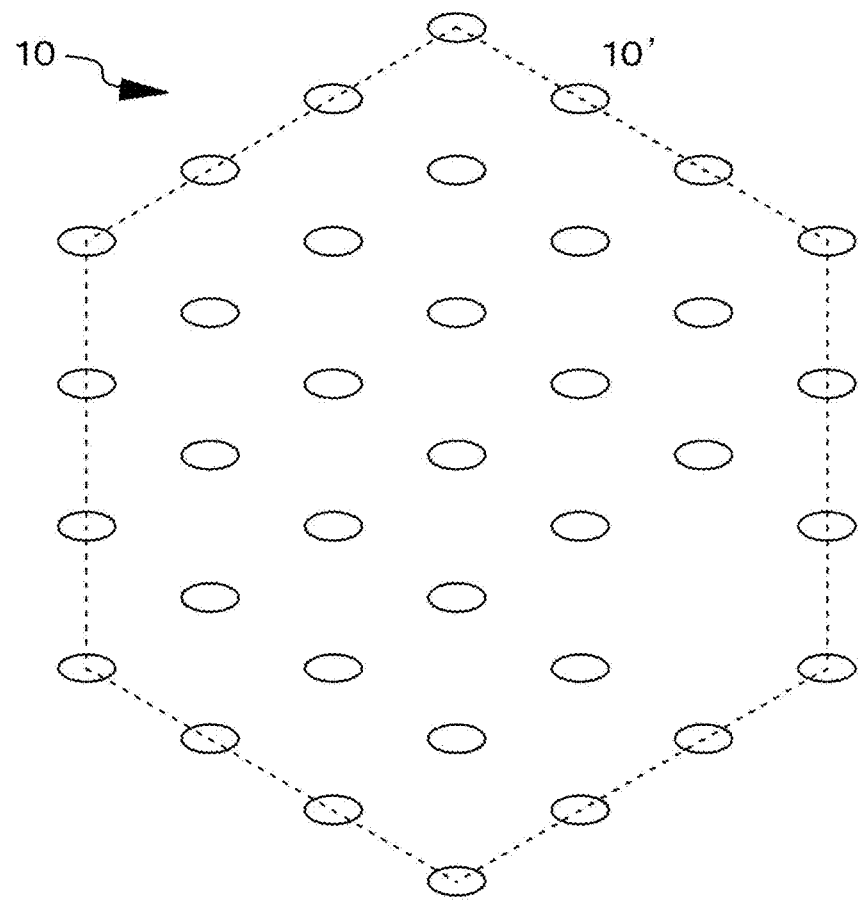
FIG. 26A and FIG. 26B are respectively a diagram schematically depicting a configuration in which multiple light emitting elements are arrayed at intersections in a honeycomb lattice and a diagram schematically depicting the cross-sectional shape of light emitted from the recessed and protruding structure unit.
Figure 26B:
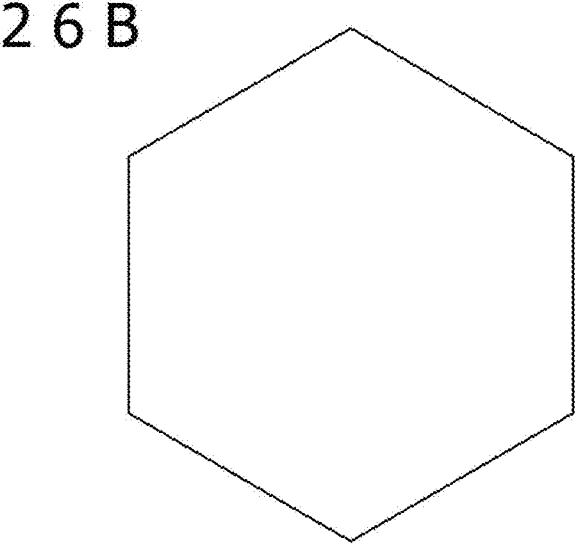

In the examples, the multiple light emitting elements 10' are arrayed on the intersections in the orthogonal grid, the arrangement shape of the multiple light emitting elements 10' arranged at the outer edge portion of the light source 10 is like a rectangle, and the cross-sectional shape of light emitted from the recessed and protruding structure unit 21 is like a rectangle. However, the present disclosure is not intended to be limited to these features. The cross-sectional shape of light emitted from the recessed and protruding structure unit 21 is approximate to the arrangement shape of the light emitting elements 10' arranged in the outermost portion of the light source 10. However, the present disclosure can be configured such that the multiple light emitting elements 10' are arrayed on intersections in a honeycomb lattice, and the arrangement shape of the multiple light emitting elements 10' arranged at the outer edge portion of the light source 10 is like a regular hexagon (depicted by dotted lines in FIG. 26A), as depicted in FIG. 26A, and the cross-sectional shape of light emitted from the recessed and protruding structure unit 21 is like a regular hexagon, as depicted in FIG. 26B.

Additionally, (c) of FIG. 9 depicts the light position distribution, along the X axis direction, of the light position distribution (≈light emission angle distribution) on the integrator 30. However, in the recessed and protruding structure unit 21, when the light emission angle distribution protrudes not only upward but also downward around the Z axis (that is, the light emission angle distribution is recessed around the Z axis, the light position distribution (≈light emission angle distribution) on the integrator 30 can be further uniformized. Additionally, light emitted from the optical member can be provided with a desired cross-sectional shape.

The light source may include a combination of semiconductor laser elements and a wavelength conversion member (wavelength conversion material layer and a color conversion material layer). The recessed and protruding structure unit is less dependent on wavelength, and can apply a similar light emission angle distribution to light with any wavelengths. In this case, the present disclosure can be configured such that white light can be emitted via the wavelength conversion material layer (color conversion material layer). Specifically, the wavelength conversion material layer through which laser light emitted from the semiconductor laser element passes is only required to be formed on a substrate.

In a case where blue light is emitted from the semiconductor laser element, a configuration in which white light is emitted via the wavelength conversion material layer can be provided by employing the following configuration.

[A] By using a wavelength conversion material layer that converts blue light emitted from the semiconductor laser element into yellow light, white light including a mixture of blue and yellow is obtained as light emitted from the wavelength conversion material layer,

[B] By using a wavelength conversion material layer that converts blue light emitted from the semiconductor laser element into orange light, white light including a mixture of blue and orange is obtained as light emitted from the wavelength conversion material layer, and

[C] By using a wavelength conversion material layer that converts blue light emitted from the semiconductor laser element into green light, white light including a mixture of blue, green, and red is obtained as light emitted from the wavelength conversion material layer.

Alternatively, in a case where ultraviolet light is emitted from the semiconductor laser element, a configuration in which white light is emitted via the wavelength conversion material layer can be provided by employing the following configuration.

[D] By using a wavelength conversion material layer that converts ultraviolet light emitted from the semiconductor laser element into blue light and a wavelength conversion material layer that converts the ultraviolet light into yellow light, white light including a mixture of blue and yellow is obtained as light emitted from the wavelength conversion material layer,

[E] By using a wavelength conversion material layer that converts ultraviolet light emitted from the semiconductor laser element into blue light and a wavelength conversion material layer that converts the ultraviolet light into orange light, white light including a mixture of blue and orange is obtained as light emitted from the wavelength conversion material layer, and

[F] By using a wavelength conversion material layer that converts ultraviolet light emitted from the semiconductor laser element into blue light and a wavelength conversion material layer that converts the ultraviolet light into green light, white light including a mixture of blue, green, and red is obtained as light emitted from the wavelength conversion material layer.

Here, a specific example of a wavelength conversion material that is excited by blue light to emit red light may be red light emitting phosphor particles, and more specific examples of the wavelength conversion material can include (ME:Eu)S ["ME" means at least one type of atoms selected from the group including Ca, Sr, and Ba, and this also applies to the description below], $(M:Sm)_x(Si, Al)_{12}(O, N)_{16}$ ["M" means at least one type of atoms selected from the group including Li, Mg, and Ca, and this also applies to the description below], $ME_2Si_5N_8$:Eu, (Ca:Eu)SiN$_2$, and (Ca:Eu)AlSiN$_3$. Additionally, a specific example of a wavelength conversion material that is excited by blue light to emit green light may be green light emitting phosphor particles, and more specific examples of the wavelength conversion material can include (ME:Eu)Ga$_2$S$_4$, $(M:RE)_x(Si, Al)_{12}(O, N)_{16}$ ["RE" means Tb and Yb], $(M:Tb)_x(Si, Al)_{12}(O, N)_{16}$, $(M:Yb)_x(Si, Al)_{12}(O, N)_{16}$, and $Si_{6-Z}Al_ZO_ZN_{8-Z}$:Eu. Furthermore, a specific example of a wavelength conversion material that is excited by blue light to emit yellow light may be yellow light emitting phosphor particles, and more specific examples of the wavelength conversion material can include YAG (yttrium, aluminum, garnet)-based phosphor particles. Note that one type of wavelength conversion material may be used or two or more types of wavelength conversion materials may be mixed. Furthermore, the present disclosure can be configured such that a mixture of two or more types of wavelength conversion materials is used to cause emitted light in a color other than yellow, green, or red to be emitted from the wavelength conversion material mixture. Specifically, for example, the present disclosure can be configured to emit cyan light, and this configuration is only required to use a mixture of green light emitting phosphor particles (for example, LaO$_4$:Ce, Tb, BaMgAl$_{10}$O$_{17}$:Eu, Mn, Zn$_2$SiO$_4$:Mn, MgAl$_{11}$O$_{19}$:Ce, Tb, Y$_2$SiO$_5$:Ce, Tb, MgAl$_{11}$O$_{19}$:CE, Tb, Mn) and blue light emitting phosphor particles (for example, BaMgAl$_{10}$O$_{17}$:Eu, BaMg$_2$Al$_{16}$O$_{27}$:Eu, Sr$_2$P$_2$O$_7$:Eu, Sr$_5$(PO$_4$)$_3$Cl:Eu, (Sr, Ca, Ba, Mg)$_5$(PO$_4$)$_3$Cl:Eu, CaWO$_4$, or CaWO$_4$:Pb).

Additionally, a specific example of a wavelength conversion material that is excited by ultraviolet rays to emit red light may be red light emitting phosphor particles, and more specific examples of the wavelength conversion material can include Y$_2$O$_3$:Eu, YVO$_4$:Eu, Y(P, V)O$_4$:Eu, 3.5MgO 0.5MgF$_2$·Ge2:Mn, CaSiO$_3$:Pb, Mn, Mg$_6$AsO$_{11}$:Mn, (Sr, Mg)$_3$(PO$_4$)$_3$:Sn, La$_2$O$_2$S:Eu, and Y$_2$O$_2$S:Eu. Additionally, a specific example of a wavelength conversion material that is excited by ultraviolet rays to emit green light may be green light emitting phosphor particles, and more specific examples of the wavelength conversion material can include LaPO$_4$:Ce, Tb, BaMgAl$_{10}$O$_{17}$:Eu, Mn, Zn$_2$SiO$_4$:Mn, MgAl$_{11}$O$_{19}$:Ce, Tb, Y$_2$SiO$_5$:Ce, Tb, MgAl$_{11}$O$_{19}$:CE, Tb, Mn, $Si_{6-Z}Al_ZO_ZN_{8-Z}$:Eu. Furthermore, a specific example of a wavelength conversion material that is excited by ultra- violet rays to emit blue light may be blue light emitting phosphor particles, and more specific examples of the wavelength conversion material can include BaMgAl$_{10}$O$_{17}$:Eu, BaMg$_2$Al$_{16}$O$_{27}$:Eu, Sr$_2$P$_2$O$_7$:Eu, Sr$_5$(PO$_4$)$_3$Cl:Eu, (Sr, Ca, Ba, Mg)$_5$(PO$_4$)$_3$Cl:Eu, CaWO$_4$, and CaWO$_4$:Pb. Moreover, a specific example of a wavelength conversion material that is excited by ultraviolet rays to emit yellow light may be yellow light emitting phosphor particles, and a more specific example of the wavelength conversion material may be YAG-based phosphor particles. Note that one type of wavelength conversion material may be used or two or more types of wavelength conversion materials may be mixed. Furthermore, the present disclosure can be configured such that a mixture of two or more types of wavelength conversion materials is used to cause emitted light in a color other than yellow, green, or red to be emitted from the wavelength conversion material mixture. Specifically, the present disclosure can be configured to emit cyan light, and this configuration is only required to use a mixture of green light emitting phosphor particles and blue light emitting phosphor particles described above.

However, the wavelength conversion material (color conversion material) is not limited to phosphor particles, and for example, light emitting particles may be used that include an indirect transition silicon-based material to which a two-dimensional quantum well structure, a one-dimensional quantum well structure (quantum wire), a zero-dimensional quantum well structure (quantum dot), or the like is applied, the two-, one-, or zero-dimensional quantum well structure using a localized wave function for carriers and using a quantum effect in order to efficiently convert carriers into light, as in a direct transition type. Additionally, rare earth atoms added to a semiconductor material are known to emit glittering light due to intra-shell transition, and light emitting particles to which such a technology is applied can be used.

Quantum dots can be used as the wavelength conversion material (color conversion material). A decrease in the size (diameter) of the quantum dot increases bandgap energy, while reducing the wavelength of light emitted from the quantum dot. In other words, a smaller quantum dot emits light with a smaller wavelength (blue light-side light), whereas a larger quantum dot emits light with a larger wavelength (red light-side light). Accordingly, by using the same material to form a quantum dot while adjusting the size of the quantum dot, quantum dots can be obtained that emit light with the desired wavelength (that perform color conversion in the desired light). Specifically, the quantum dot preferably has a core-shell structure. Examples of the material constituting quantum dots include, for example, but not limited to, Si; Se; CIGS(CuInGaSe), CIS(CuInSe$_2$), CuInS$_2$, CuAlS$_2$, CuAlSe$_2$, CuGaS$_2$, CuGaSe$_2$, AgAlS$_2$, AgAlSe$_2$, AgInS$_2$, and AgInSe$_2$, which are chalcopyrite compounds; a perovskite material; GaAs, GaP, InP, InAs, InGaAs, AlGaAs, InGaP, AlGaInP, InGaAsP, and GaN, which are group III-V compounds; CdSe, CdSeS, CdS, CdTe, In$_2$Se$_3$, In$_2$S$_3$, Bi$_2$Se$_3$, Bi$_2$S$_3$, ZnSe, ZnTe, ZnS, HgTe, HgS, PbSe, PbS, and TiO$_2$, and the like.

Note that the present disclosure can also provide the following configurations.

[A01]

«Illumination Apparatus»

An illumination apparatus including:
   a light source;
   an optical member including a first surface on which light from the light source is incident and a second surface facing the first surface; and an integrator on which light emitted from the optical member is incident, in which the optical member is rotatable around a rotation axis extending parallel to a direction in which light from the light source is incident and is emitted, a planar shape of the optical member (the planar shape of the optical member obtained by cutting the optical member along a virtual plane orthogonal to the rotation axis) is annular around the rotation axis, multiple recessed and protruding structure units each having a fan-surface-like planar shape and including a recessed and protruding portion are consecutively formed on the first surface or the second surface of the optical member, an extended line of a boundary between adjacent recessed and protruding structure units intersects the rotation axis, when the boundary between the adjacent recessed and protruding structure units is a mirror plane, the adjacent recessed and protruding structure units are in a mirror symmetry relation, and recessed and protruding portions of the adjacent recessed and protruding structure units are smoothly connected together, and recessed portions and protruding portions of the recessed and protruding portion of each recessed and protruding structure unit are smoothly connected together, and an area occupied by the recessed and protruding portion of each recessed and protruding structure unit is larger in size than incident light from the light surface.

[A02]

The illumination apparatus according to [A01], in which the recessed and protruding portion refracts incident light from the light source.

[A03]

The illumination apparatus according to [A01] or [A02], in which the light source emits light with multiple wavelengths.

[A04]

The illumination apparatus according to any one of [A01] to [A03], in which, when a shape of light obtained by cutting the light along a virtual plane orthogonal to a traveling direction of the light is referred to as a cross-sectional shape of the light, the cross-sectional shape of light incident on the recessed and protruding structure unit from the light source is different from the cross-sectional shape of light emitted from the recessed and protruding structure unit.

[A05]

The illumination apparatus according to any one of [A01] to [A04], in which the light source includes multiple light emitting elements arrayed in a two-dimensional matrix, and, when a shape of light obtained by cutting the light along a virtual plane orthogonal to a traveling direction of the light is referred to as a cross-sectional shape of the light, the cross-sectional shape of light emitted from the recessed and protruding structure unit is approximate to an arrangement shape of the light emitting elements arranged in an outermost portion of the light source.

[A06]

The illumination apparatus according to [A05], in which the multiple light emitting elements are arrayed on intersections in an orthogonal grid, the arrangement shape of the multiple light emitting elements arranged at an outer edge portion of the light source is like a rectangle, and the cross-sectional shape of the light emitted from the recessed and protruding structure unit is like a rectangle.

[A07]

The illumination apparatus according to [A05], in which the multiple light emitting elements are arrayed on intersections in a honeycomb lattice, the arrangement shape of multiple the light emitting elements at the outer edge portion of the light source is like a regular hexagon, and the cross-sectional shape of light emitted from the recessed and protruding structure unit is a regular hexagon.

[A08]

The illumination apparatus according to any one of [A01] to [A05], in which the light source includes multiple light emitting elements arrayed in a two-dimensional matrix, and the cross-sectional shape of light emitted from the recessed and protruding structure unit is approximate to the external shape of the integrator.

[A09]

The illumination apparatus according to [A08], in which the multiple light emitting elements are arrayed on intersections in an orthogonal grid, and the external shape of the integrator is like a square or a rectangle.

[A10]

The illumination apparatus according to any one of [A01] to [A09], in which the recessed and protruding portion of the recessed and protruding structure unit is designed in compliance with a Gerchberg-Saxton method.

[A11]

The illumination apparatus according to any one of [A01] to [A10], in which, when an X axis refers to an axis passing through a center of the recessed and protruding structure unit and through a rotation axis and located in a surface of the recessed and protruding structure unit provided with the recessed and protruding portion, a Z axis refers to an axis passing through the center of the recessed and protruding structure unit and that is parallel to the rotation axis, and a Y axis refers to an axis that is orthogonal to the X axis and the Z axis and that is located in a surface of the recessed and protruding structure unit provided with the recessed and protruding portion, an average value $F_{X\text{-}ave}$ of a spatial frequency of the recessed and protruding portion along the X axis is $1 \times 10^3$ mm$^{-1}$ or less, and an average value $F_{Y\text{-}ave}$ of the spatial frequency of the recessed and protruding portion along the Y axis is $1 \times 10^3$ mm$^{-1}$ or less.

[A12]

The illumination apparatus according to [A11], in which the average value $F_{X\text{-}ave}$ of the spatial frequency of the recessed and protruding portion along the X axis is $1 \times 10^2$ mm$^{-1}$ or less, and the average value $F_{Y\text{-}ave}$ of the spatial frequency of the recessed and protruding portion along the Y axis is $1 \times 10^2$ mm$^{-1}$ or less.

[A13]

The illumination apparatus according to [A11] or [A12], in which, when $F_{X'\text{-}ave}$ denotes the average value of the spatial frequency of the recessed and protruding portion along a straight line satisfying Y=X and $F_{Y'\text{-}ave}$ denotes the average value of the spatial frequency of the recessed and protruding portion along a straight line satisfying Y=−X, $$F_{X'\text{-}ave} > F_{X\text{-}ave},$$

$$F_{X'\text{-}ave} > F_{Y\text{-}ave},$$

$$F_{Y'\text{-}ave} > F_{X\text{-}ave}, \text{ and}$$

$$F_{Y'\text{-}ave} > F_{Y\text{-}ave} \text{ are satisfied.}$$

[A14]
The illumination apparatus according to any one of [A11] to [A13], in which,
when $L_{X\text{-}0}$ denotes a length along the X axis of the recessed and protruding structure unit on which light from the light source is incident and $L_{Y\text{-}0}$ denotes a length, along the Y axis, of the recessed and protruding structure unit on which light from the light source is incident, $$L_{X\text{-}0} \times F_{X\text{-}ave} \geq 10, \text{ and}$$

$$L_{Y\text{-}0} \times F_{Y\text{-}ave} \geq 10 \text{ are satisfied.}$$

[A15]
The illumination apparatus according to [A14], in which $$L_{X\text{-}0} \times F_{X\text{-}ave} \geq 15, \text{ and}$$

$$L_{Y\text{-}0} \times F_{Y\text{-}ave} \geq 15 \text{ are satisfied.}$$

[A16]
The illumination apparatus according to any one of [A11] to [A15], in which $$F_{X\text{-}ave} \neq F_{Y\text{-}ave} \text{ is obtained.}$$

[A17]
The illumination apparatus according to any one of [A01] to [A16], in which
the recessed and protruding structure unit has a kurtosis β of −0.5 or less.

[A18]
The illumination apparatus according to any one of [A01] to [A17], in which
light from the light source is incident on each recessed and protruding structure unit in a rotating state from a first surface of each recessed and protruding structure unit and is emitted from a second surface of each recessed and protruding structure unit toward the integrator,
the first surface of each recessed and protruding structure unit is provided with the recessed and protruding portion, and
the second surface of each recessed and protruding structure unit is flat.

[A19]
The illumination apparatus according to any one of [A01] to [A17], in which
light from the light source is incident on each recessed and protruding structure unit in a rotating state from a first surface of each recessed and protruding structure unit and is emitted from the first surface of each recessed and protruding structure unit toward the integrator, and
the first surface of each recessed and protruding structure unit is provided with the recessed and protruding portion, and
the second surface of each recessed and protruding structure unit is flat and constitutes a light reflection surface.

[A20]
The illumination apparatus according to [A19], further including:
a polarization beam splitter; and
a quarter wavelength plate, in which
light from the light source enters the polarization beam splitter, exits the polarization beam splitter along a first direction, passes through the quarter wavelength plate, is reflected at the recessed and protruding structure unit, passes through the quarter wavelength plate, enters the polarization beam splitter, exits the polarization beam splitter along a second direction different from the first direction, and enters the integrator.

[A21]
The illumination apparatus according to any one of [A01] to [A20], in which,
when an XZ virtual plane in the recessed and protruding structure unit is a mirror plane, two areas of the recessed and protruding structure unit located across the XZ virtual surface are in a mirror symmetry relation, and the recessed and protruding portions in the two areas are smoothly connected together.

[A22]
The illumination apparatus according to any one of [A01] to [A21], in which
the recessed and protruding portion is designed such that the external shape of light emitted from the recessed and protruding structure unit in the non-rotating state is like an isosceles trapezoid including a bottom side (rotation axis side) longer than a top side, the top side and the bottom side extending parallel to the Y axis.

[A23]
The illumination apparatus according to [A22], in which
a relation between the value $A_1$ of (length of the bottom side)/(length of the top side) and the value $A_2$ of (outer diameter)/(inner diameter) of a fan-surface-like recessed and protruding structure unit satisfies:

$$0.85 \leq A_1/A_2 \leq 1.15.$$

[A24]
The illumination apparatus according to [A23], in which $$A_1/A_2 = 1.0 \text{ is satisfied.}$$

[A25]
The illumination apparatus according to any one of [A01] to [A24], in which,
when an XZ virtual plane in the recessed and protruding structure unit is a mirror plane, two areas of the recessed and protruding structure unit located across the XZ virtual surface are in a mirror symmetry relation, and the recessed and protruding portions in the two areas are smoothly connected together.

[A26]
The illumination apparatus according to any one of [A01] to [A25], in which,
when the recessed and protruding portion is expressed as Z=f(X, Y), inclinations of the recessed and protruding portion in the X axis direction and the Y axis direction are obtained by:

$$\partial Z/\partial X = [\partial f(X, Y)/\partial X]_Y$$

$$\partial Z/\partial Y = [\partial f(X, Y)/\partial Y]_X, \text{ and}$$

∂Z/∂Y and ∂Z/∂Y are not point-asymmetric when an intersection between the X axis and the Y axis is a point of symmetry.

[B01]
«Projective Display Apparatus»
A projective display apparatus including:
an illumination apparatus including a light source, an optical member on and from which light from the light source is incident and is emitted, and an integrator on which light from the optical member is incident;
an optical modulation apparatus configured to modulate light emitted from the illumination apparatus on a basis of image information to generate an image; and
a projective optical system configured to receive an image projected from the optical modulation apparatus, in which
the illumination apparatus includes the illumination apparatus according to any one of [A01] to [A26].

[C01]
«Optical Element»
An optical element including:
a first surface; and
a second surface facing the first surface, in which
light from a light source emitting light with multiple wavelengths is incident on the first surface,
the first surface or the second surface is provided with a recessed and protruding portion configured to refract incident light from the light source,
an area occupied by the recessed and protruding portion is larger in size than incident light from the light source,
recessed portions and protruding portions of the recessed and protruding portion are smoothly connected together, and,
when a shape of light obtained by cutting the light along a virtual plane orthogonal to a traveling direction of the light is referred to as a cross-sectional shape of the light, the cross-sectional shape of light emitted from the optical element is like a rectangle, a polygon or a shape with one or more angles.

[C02]
The optical element according to [C01], in which
the cross-sectional shape of light incident on the optical element from the light source is like a circle or an ellipse.

REFERENCE SIGNS LIST

10: Light source
10R, 10G, 10B: Semiconductor laser element
11R, 11G, 11B: Lens
12: Dichroic prism
13: Lens system
20: Optical member
20A: First surface of optical member (recessed and protruding structure unit)
20B: Second surface of optical member (recessed and protruding structure unit)
21: Recessed and protruding structure unit
22: Substrate
23: Driving motor
24: Condenser lens
25: Polarization beam splitter
26: Quarter wavelength plate
27: Condenser lens
30: Integrator
110: Illumination apparatus
130: Optical modulation apparatus (image forming unit)
140: Projective optical system
AR: Rotation axis
BL: Boundary between recessed and protruding structure units

What is claimed is:

1. An illumination apparatus, comprising:
a light source;
an optical member including a first surface on which light from the light source is incident and a second surface facing the first surface; and
an integrator on which light emitted from the optical member is incident, wherein
the optical member is rotatable around a rotation axis extending parallel to a direction in which light from the light source is incident and is emitted,
a planar shape of the optical member is annular around the rotation axis,
multiple recessed and protruding structure units each having a fan-surface-like planar shape and including a recessed and protruding portion are consecutively formed on the first surface or the second surface of the optical member,
an extended line of a boundary between adjacent recessed and protruding structure units intersects the rotation axis,
when the boundary between the adjacent recessed and protruding structure units is a mirror plane, the adjacent recessed and protruding structure units are in a mirror symmetry relation, and recessed and protruding portions of the adjacent recessed and protruding structure units are smoothly connected together,
recessed portions and protruding portions of the recessed and protruding portion of each recessed and protruding structure unit are smoothly connected together, and
an area occupied by the recessed and protruding portion of each recessed and protruding structure unit is larger in size than incident light from the light source.

2. The illumination apparatus according to claim 1, wherein
the recessed and protruding portion refracts incident light from the light source.

3. The illumination apparatus according to claim 1, wherein
the light source emits light with multiple wavelengths.

4. The illumination apparatus according to claim 1, wherein,
when a shape of light obtained by cutting the light along a virtual plane orthogonal to a traveling direction of the light is referred to as a cross-sectional shape of the light, the cross-sectional shape of light incident on the recessed and protruding structure unit from the light source is different from the cross-sectional shape of light emitted from the recessed and protruding structure unit.

5. The illumination apparatus according to claim 1, wherein
the light source includes multiple light emitting elements arrayed in a two-dimensional matrix, and,
when a shape of light obtained by cutting the light along a virtual plane orthogonal to a traveling direction of the light is referred to as a cross-sectional shape of the light, the cross-sectional shape of light emitted from the recessed and protruding structure unit is approximate to an arrangement shape of the light emitting elements arranged in an outermost portion of the light source.

6. The illumination apparatus according to claim 5, wherein
the multiple light emitting elements are arrayed on intersections in an orthogonal grid, the arrangement shape of the multiple light emitting elements arranged at an outer edge portion of the light source is like a rectangle, and the cross-sectional shape of the light emitted from the recessed and protruding structure unit is like a rectangle.

7. The illumination apparatus according to claim 1, wherein the recessed and protruding portion of the recessed and protruding structure unit is designed in compliance with a Gerchberg-Saxton method.

8. The illumination apparatus according to claim 1, wherein, when an X axis refers to an axis passing through a center of the recessed and protruding structure unit and through a rotation axis and located in a surface of the recessed and protruding structure unit provided with the recessed and protruding portion, a Z axis refers to an axis passing through the center of the recessed and protruding structure unit and that is parallel to the rotation axis, and a Y axis refers to an axis that is orthogonal to the X axis and the Z axis and that is located in a surface of the recessed and protruding structure unit provided with the recessed and protruding portion, an average value $F_{X\text{-}ave}$ of a spatial frequency of the recessed and protruding portion along the X axis is $1\times10^3$ mm$^{-1}$ or less, and an average value $F_{Y\text{-}ave}$ of the spatial frequency of the recessed and protruding portion along the Y axis is $1\times10^3$ mm$^{-1}$ or less.

9. The illumination apparatus according to claim 8, wherein the average value $F_{X\text{-}ave}$ of the spatial frequency of the recessed and protruding portion along the X axis is $1\times10^2$ mm$^{-1}$ or less, and the average value $F_{Y\text{-}ave}$ of the spatial frequency of the recessed and protruding portion along the Y axis is $1\times10^2$ mm$^{-1}$ or less.

10. The illumination apparatus according to claim 8, wherein, when $F_{X'\text{-}ave}$ denotes the average value of the spatial frequency of the recessed and protruding portion along a straight line satisfying Y=X and $F_{Y'\text{-}ave}$ denotes the average value of the spatial frequency of the recessed and protruding portion along a straight line satisfying Y=−X, $F_{X'\text{-}ave} > F_{X\text{-}ave}$, $F_{X'\text{-}ave} > F_{Y\text{-}ave}$, $F_{Y'\text{-}ave} > F_{X\text{-}ave}$, and $F_{Y'\text{-}ave} > F_{Y\text{-}ave}$ are satisfied.

11. The illumination apparatus according to claim 8, wherein, when $L_{X\text{-}0}$ denotes a length along the X axis of the recessed and protruding structure unit on which light from the light source is incident and $L_{Y\text{-}0}$ denotes a length, along the Y axis, of the recessed and protruding structure unit on which light from the light source is incident, $L_{X\text{-}0} \times F_{X\text{-}ave} \geq 10$, and $L_{Y\text{-}0} \times F_{Y\text{-}ave} \geq 10$ are satisfied.

12. The illumination apparatus according to claim 11, wherein $L_{X\text{-}0} \times F_{X\text{-}ave} \geq 15$, and $L_{Y\text{-}0} \times F_{Y\text{-}ave} \geq 15$ are satisfied.

13. The illumination apparatus according to claim 8, wherein $F_{X\text{-}ave} \neq F_{Y\text{-}ave}$ is obtained.

14. The illumination apparatus according to claim 1, wherein the recessed and protruding structure unit has a kurtosis β of −0.5 or less.

15. The illumination apparatus according to claim 1, wherein light from the light source is incident on each recessed and protruding structure unit in a rotating state from a first surface of each recessed and protruding structure unit and is emitted from a second surface of each recessed and protruding structure unit toward the integrator, the first surface of each recessed and protruding structure unit is provided with the recessed and protruding portion, and the second surface of each recessed and protruding structure unit is flat.

16. The illumination apparatus according to claim 1, wherein light from the light source is incident on each recessed and protruding structure unit in a rotating state from a first surface of each recessed and protruding structure unit and is emitted from the first surface of each recessed and protruding structure unit toward the integrator, and the first surface of each recessed and protruding structure unit is provided with the recessed and protruding portion, and the second surface of each recessed and protruding structure unit is flat and constitutes a light reflection surface.

17. The illumination apparatus according to claim 16, further comprising:

a polarization beam splitter; and a quarter wavelength plate, wherein light from the light source enters the polarization beam splitter, exits the polarization beam splitter along a first direction, passes through the quarter wavelength plate, is reflected at the recessed and protruding structure unit, passes through the quarter wavelength plate, enters the polarization beam splitter, exits the polarization beam splitter along a second direction different from the first direction, and enters the integrator.

18. A projective display apparatus, comprising:

an illumination apparatus including a light source, an optical member on and from which light from the light source is incident and is emitted, and an integrator on which light from the optical member is incident;

an optical modulation apparatus configured to modulate light emitted from the illumination apparatus on a basis of image information to generate an image; and a projective optical system configured to receive an image projected from the optical modulation apparatus, wherein the illumination apparatus includes the illumination apparatus according to claim 1.

* * * * *